(12) United States Patent
Iwasaki

(10) Patent No.: US 12,510,771 B2
(45) Date of Patent: Dec. 30, 2025

(54) DISPLAY DEVICE AND DISPLAY SYSTEM

(71) Applicant: SONY GROUP CORPORATION, Tokyo (JP)

(72) Inventor: Masanori Iwasaki, Tokyo (JP)

(73) Assignee: SONY GROUP CORPROATION, Kanagawa (JP)

( * ) Notice: Subject to any disclaimer, the term of this patent is extended or adjusted under 35 U.S.C. 154(b) by 714 days.

(21) Appl. No.: 17/756,303

(22) PCT Filed: Nov. 4, 2020

(86) PCT No.: PCT/JP2020/041188
§ 371 (c)(1),
(2) Date: May 20, 2022

(87) PCT Pub. No.: WO2021/111792
PCT Pub. Date: Jun. 10, 2021

(65) Prior Publication Data
US 2022/0390765 A1    Dec. 8, 2022

(30) Foreign Application Priority Data

Dec. 2, 2019    (JP) ................................. 2019-218358

(51) Int. Cl.
*G02C 7/08* (2006.01)
*A61F 2/16* (2006.01)
(Continued)

(52) U.S. Cl.
CPC ............ *G02C 7/083* (2013.01); *A61F 2/1613* (2013.01); *G02B 27/0172* (2013.01); *G02C 7/04* (2013.01);
(Continued)

(58) Field of Classification Search
None
See application file for complete search history.

(56) References Cited

U.S. PATENT DOCUMENTS

| | | | |
|---|---|---|---|
| 2009/0189974 A1* | 7/2009 | Deering | G02B 27/0093 348/51 |
| 2013/0201080 A1 | 8/2013 | Evans et al. | |

(Continued)

FOREIGN PATENT DOCUMENTS

| | | |
|---|---|---|
| CN | 104254800 A | 12/2014 |
| CN | 108474939 A | 8/2018 |

(Continued)

OTHER PUBLICATIONS

International Search Report and Written Opinion of PCT Application No. PCT/JP2020/041188, issued on Jan. 26, 2021, 08 pages of ISRWO.

*Primary Examiner* — Bao-Luan Q Le
*Assistant Examiner* — Danell L Owens
(74) *Attorney, Agent, or Firm* — CHIP LAW GROUP

(57) ABSTRACT

The present technology provides a display device that is able to display information in a region larger than a visual field region and cause the information to be visually recognized. The display device according to the present technology includes a light irradiation system configured to apply light through a pupil on at least a region outside an ambient light irradiation region, within a larger region than the ambient light irradiation region, the larger region including the ambient light irradiation region, the ambient light irradiation region being a region in a retina on which ambient light is to be applied through the pupil. According to the present technology, it is possible to provide a display device that is able to display information in a region larger than a visual field region and cause the information to be visually recognized.

26 Claims, 39 Drawing Sheets

(51) Int. Cl.
  *G02B 27/01* (2006.01)
  *G02C 7/04* (2006.01)
  *G02F 1/1362* (2006.01)

(52) U.S. Cl.
  CPC .............. *G02F 1/136286* (2013.01); *G02B 2027/0123* (2013.01); *G02B 2027/0134* (2013.01)

(56) References Cited

U.S. PATENT DOCUMENTS

| | | | |
|---|---|---|---|
| 2015/0312560 A1* | 10/2015 | Deering | G02B 27/0172 345/1.3 |
| 2018/0367769 A1 | 12/2018 | Greenberg | |
| 2019/0137857 A1 | 5/2019 | Sugawara et al. | |
| 2020/0345555 A1* | 11/2020 | Saini | A61F 2/1624 |

FOREIGN PATENT DOCUMENTS

| | | |
|---|---|---|
| CN | 109313343 A | 2/2019 |
| EP | 2812748 A2 | 12/2014 |
| EP | 3384337 A1 | 10/2018 |
| EP | 3435138 A1 | 1/2019 |
| EP | 3470909 A1 | 4/2019 |
| EP | 3489737 A2 | 5/2019 |
| JP | 10-301055 A | 11/1998 |
| JP | 2010-506240 A | 2/2010 |
| JP | 2014-209256 A | 11/2014 |
| JP | 2015-513688 A | 5/2015 |
| JP | 2017-223943 A | 12/2017 |
| JP | 2018-063436 A | 4/2018 |
| JP | 2018-538573 A | 12/2018 |
| KR | 10-2018-0091028 A | 8/2018 |
| RU | 2018122714 A | 1/2020 |
| TR | 201711217 A2 | 2/2019 |
| TW | 201730628 A | 9/2017 |
| WO | 2013/119576 A2 | 8/2013 |
| WO | 2017/094002 A1 | 6/2017 |
| WO | 2017/213241 A1 | 12/2017 |
| WO | 2019/101994 A1 | 5/2019 |

* cited by examiner

[FIG. 1A]
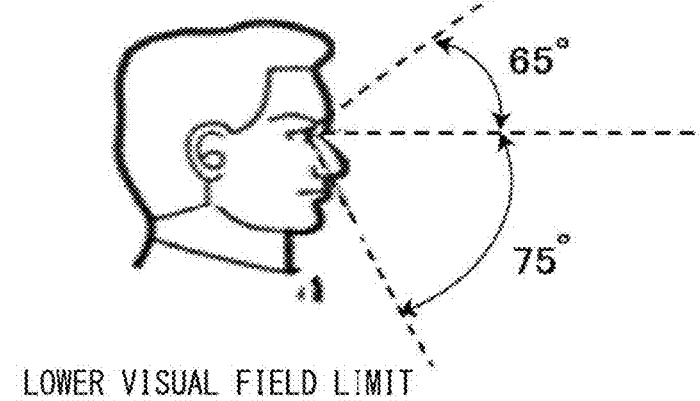
[FIG. 1B]
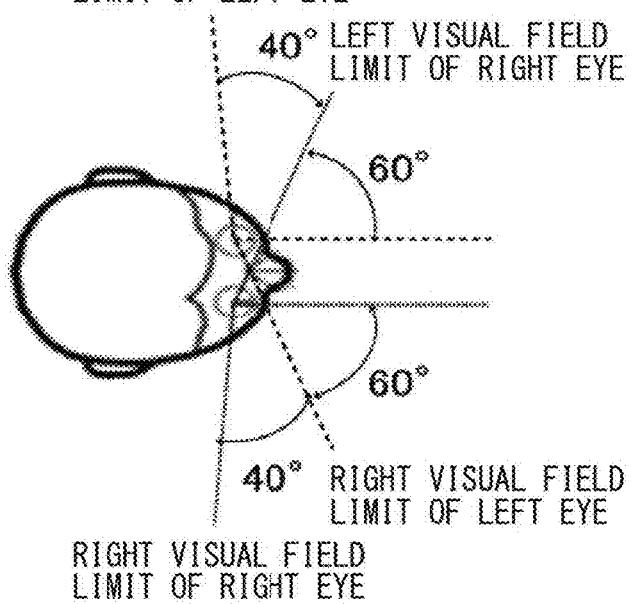

[FIG. 2]
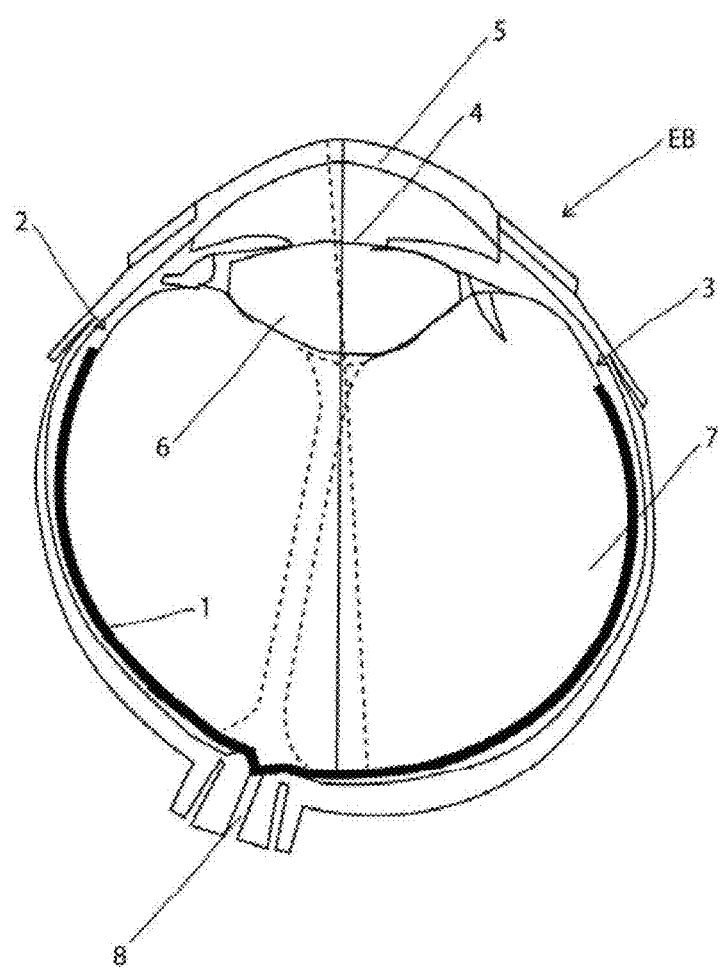

[FIG. 3A]
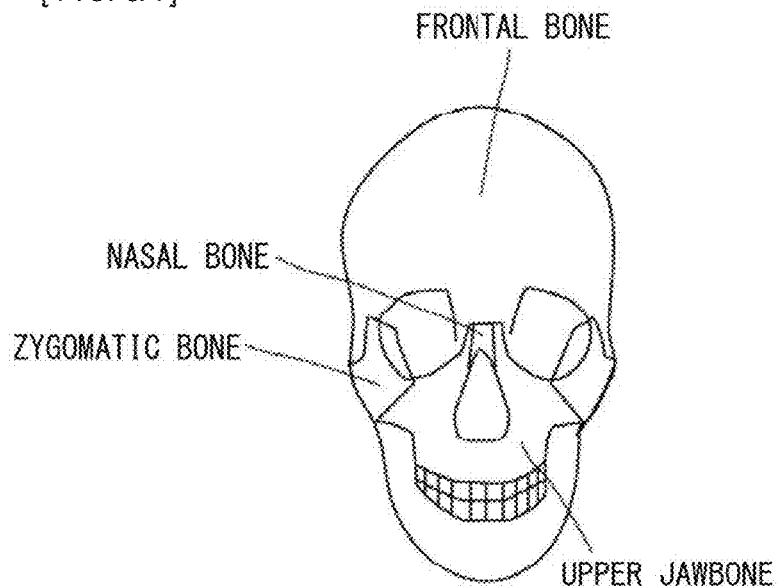
[FIG. 3B]
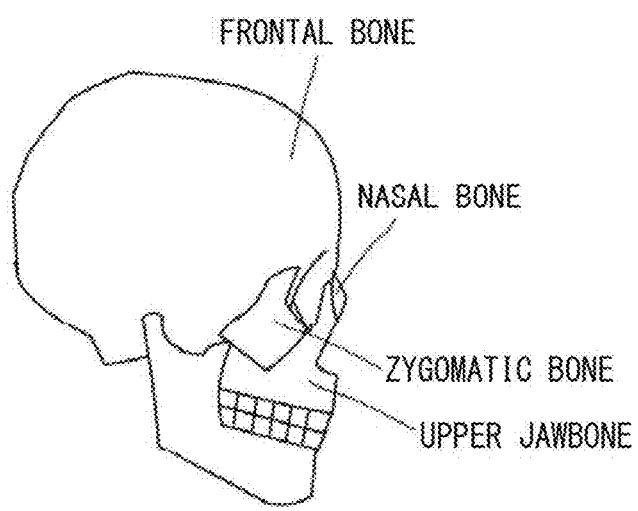

[FIG. 4]
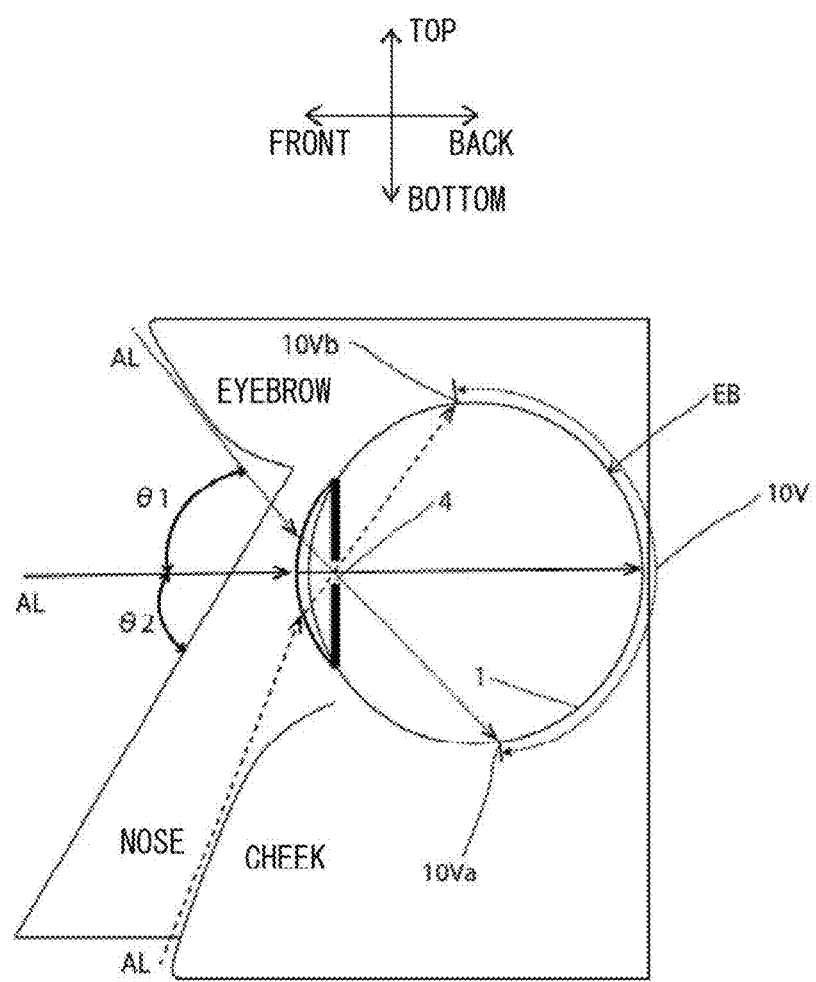

[FIG. 5]
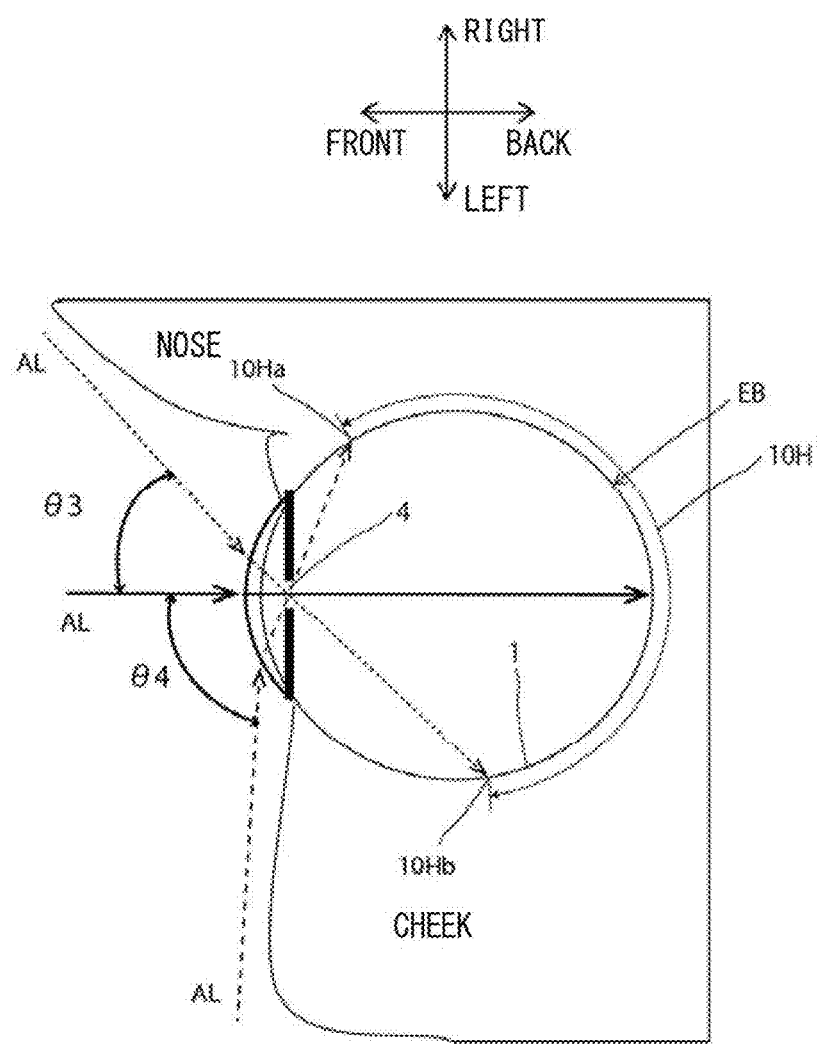

[ FIG. 6 ]
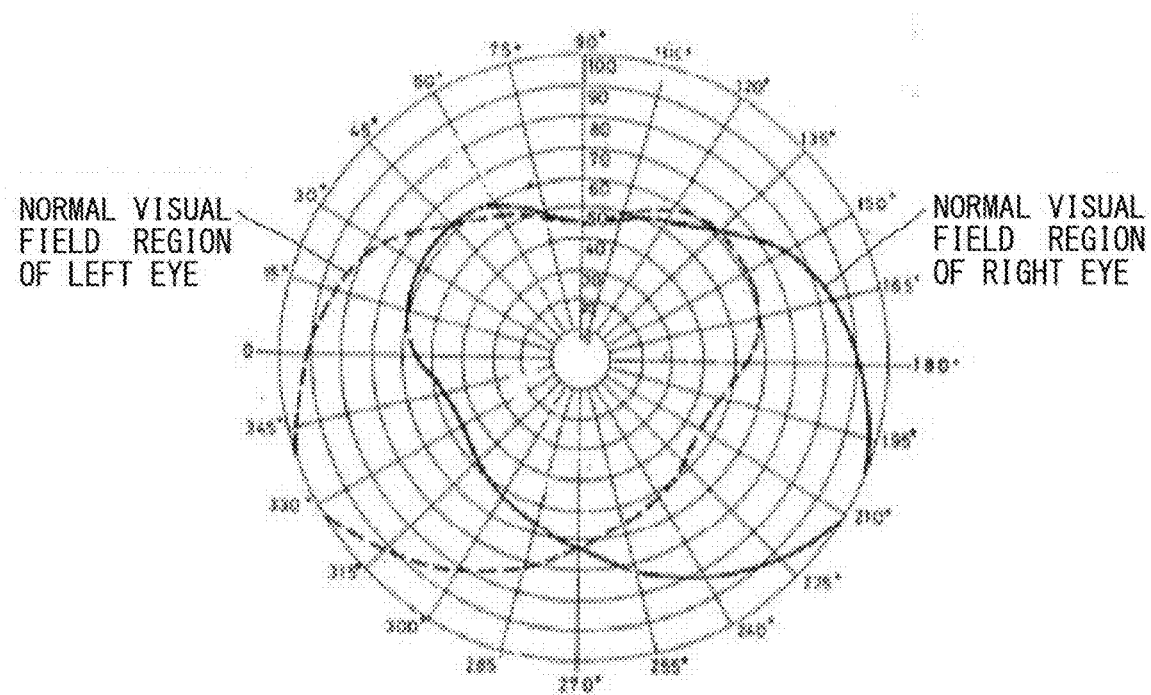

[FIG. 7]
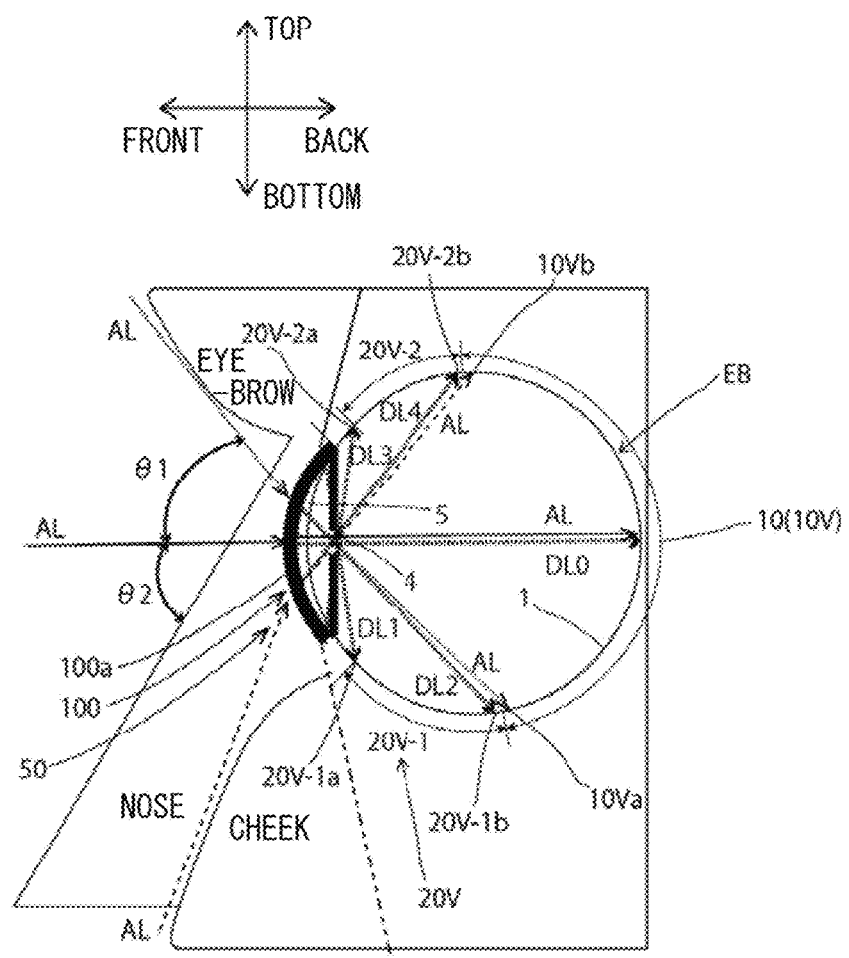

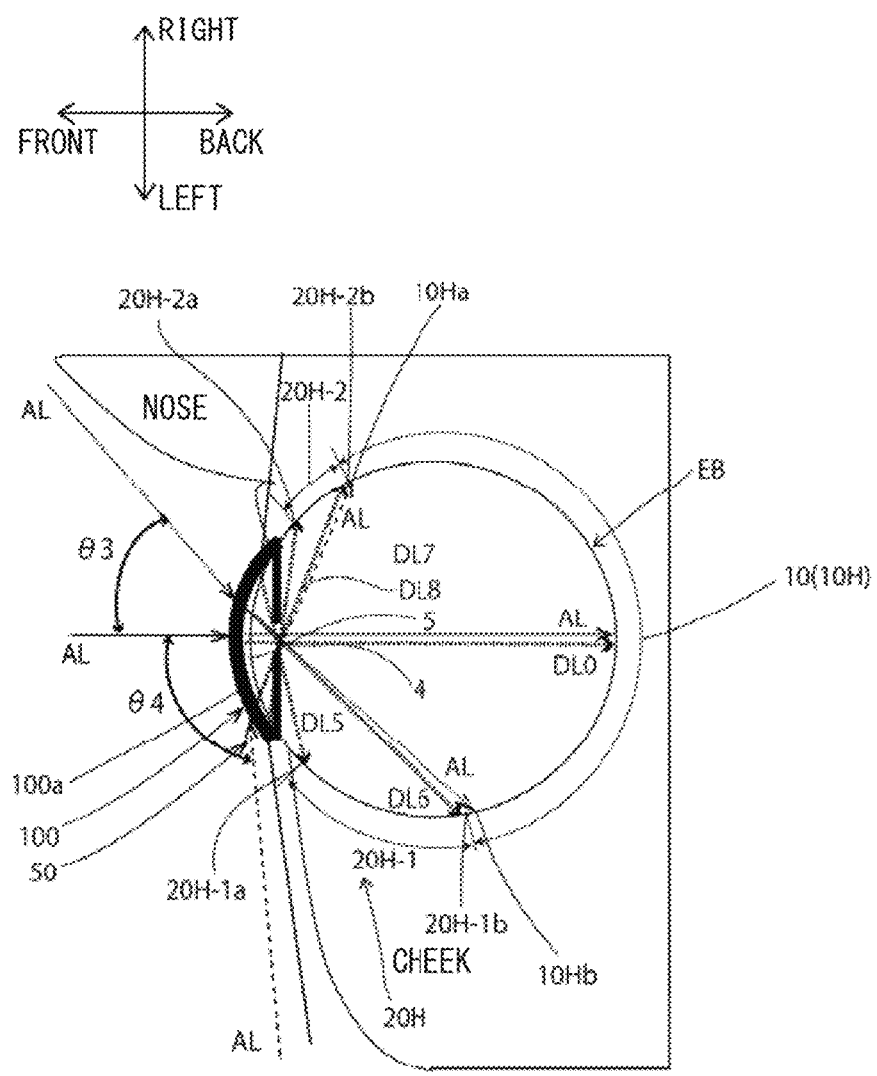
[FIG. 8]

[ FIG. 9 ]
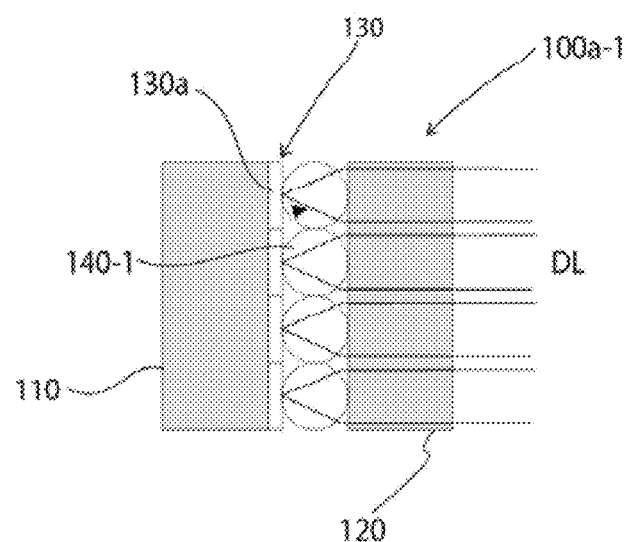

[ FIG. 10 ]
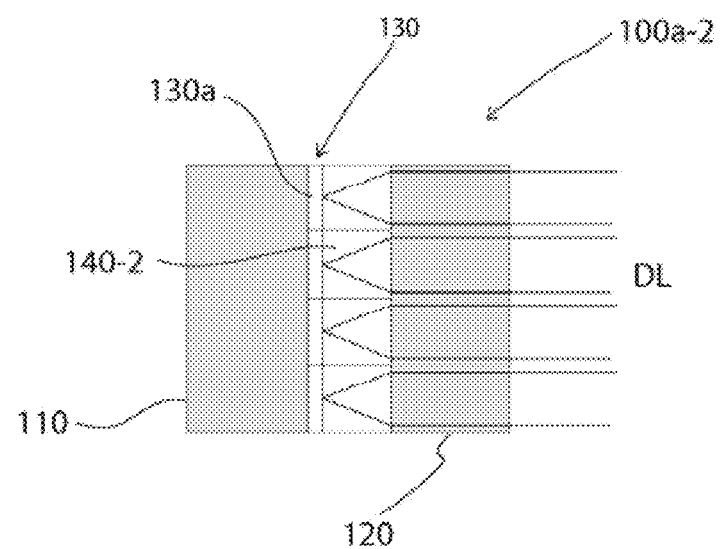

[ FIG. 11 ]
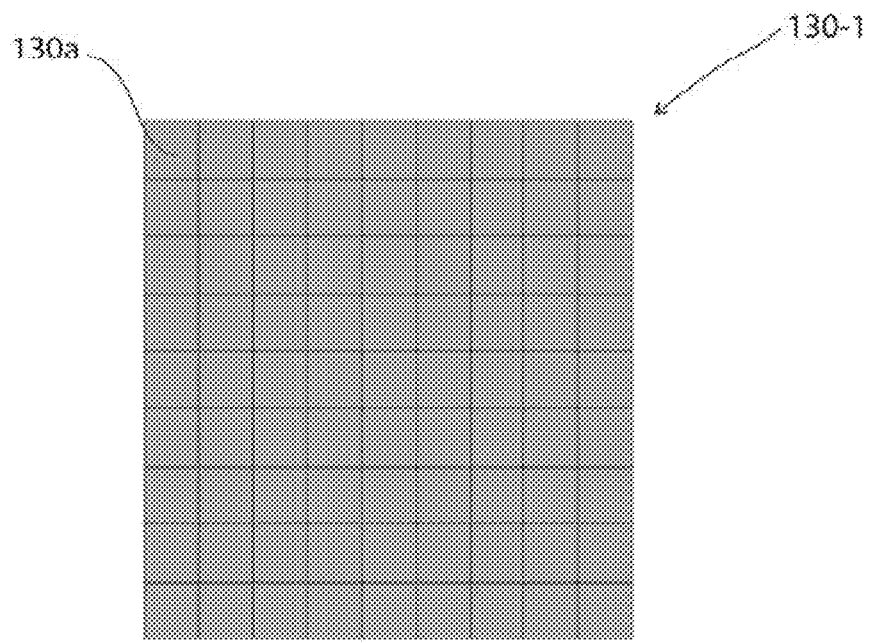

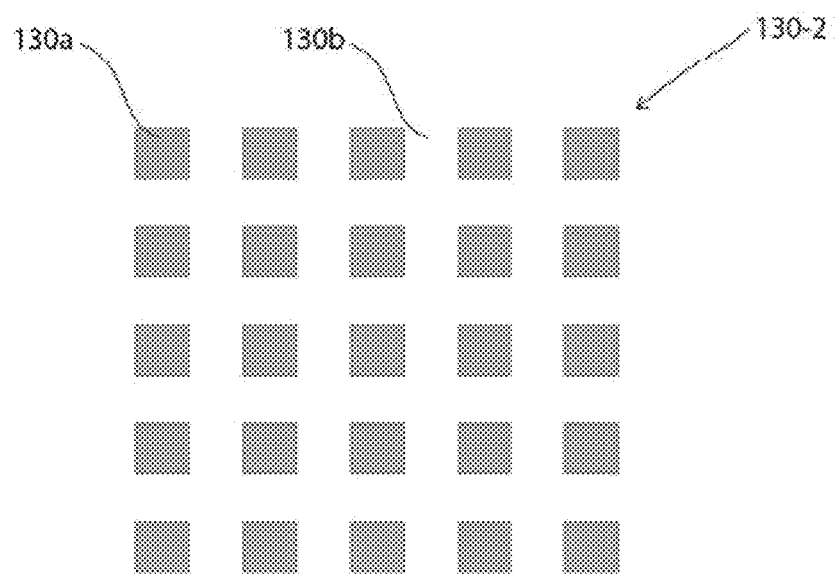
[FIG. 12]

[ FIG. 13 ]
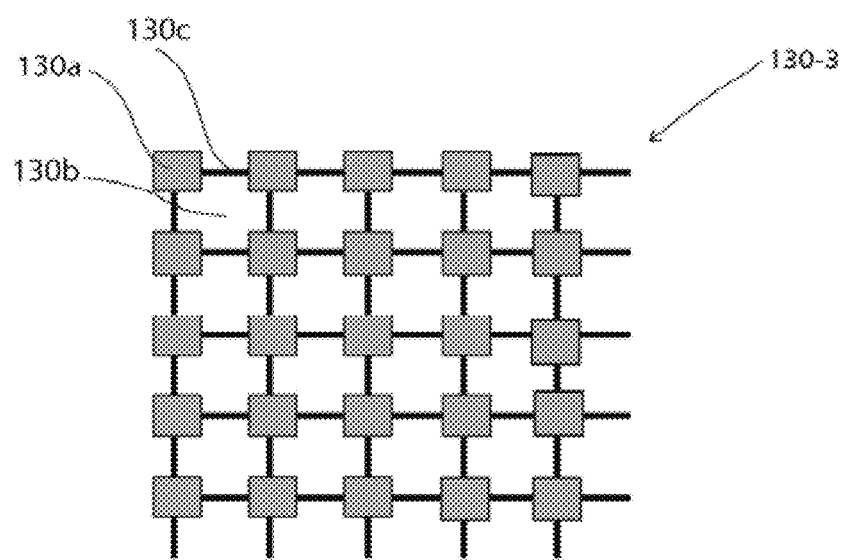

[ FIG. 14 ]
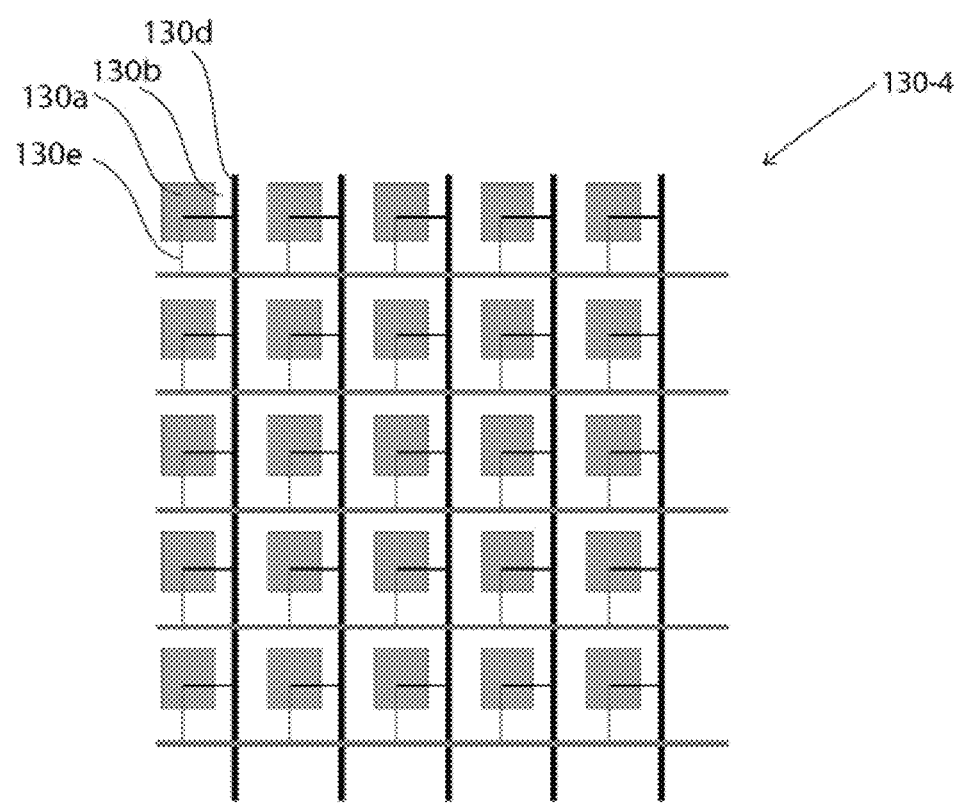

[ FIG. 15 ]
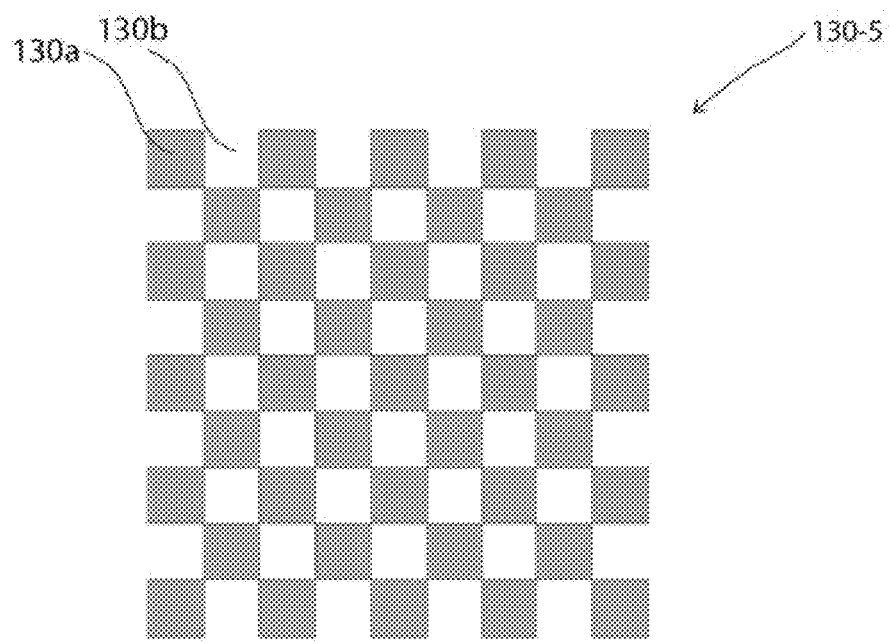

[FIG. 16]
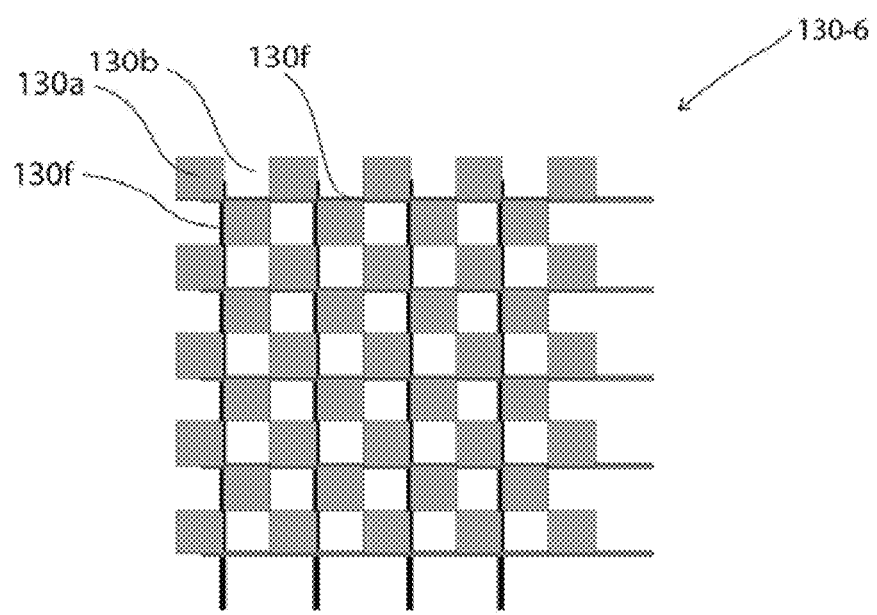

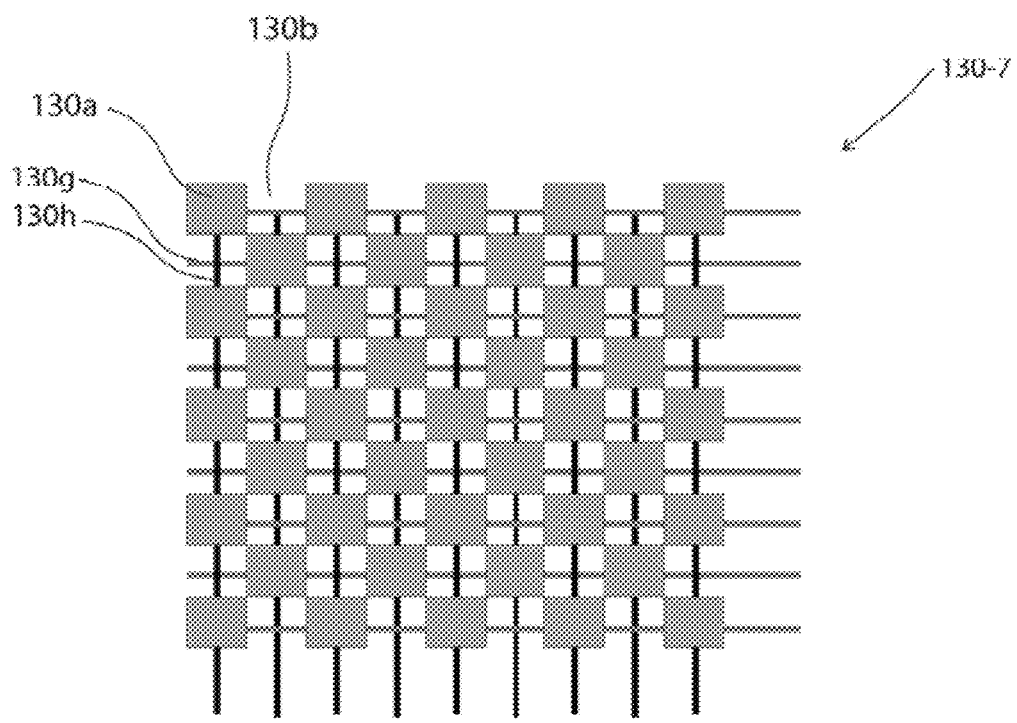
[ FIG. 17 ]

[FIG. 18]
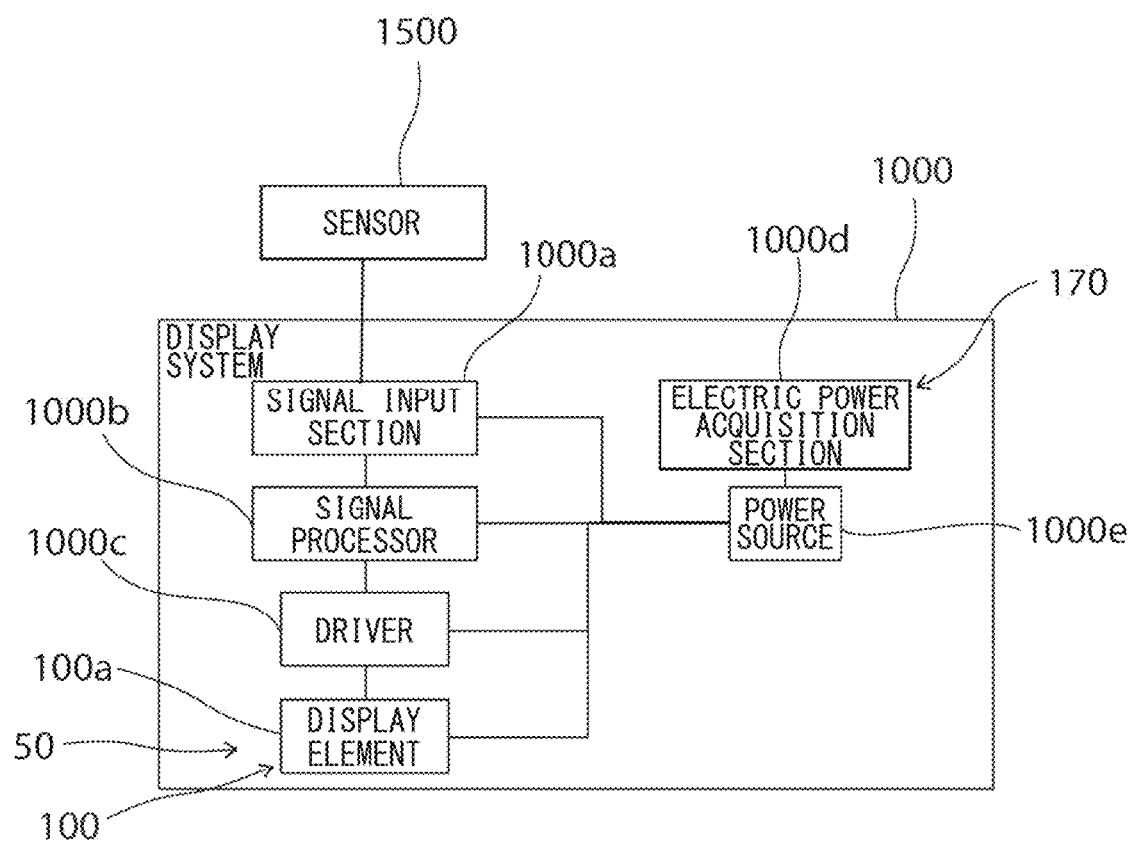

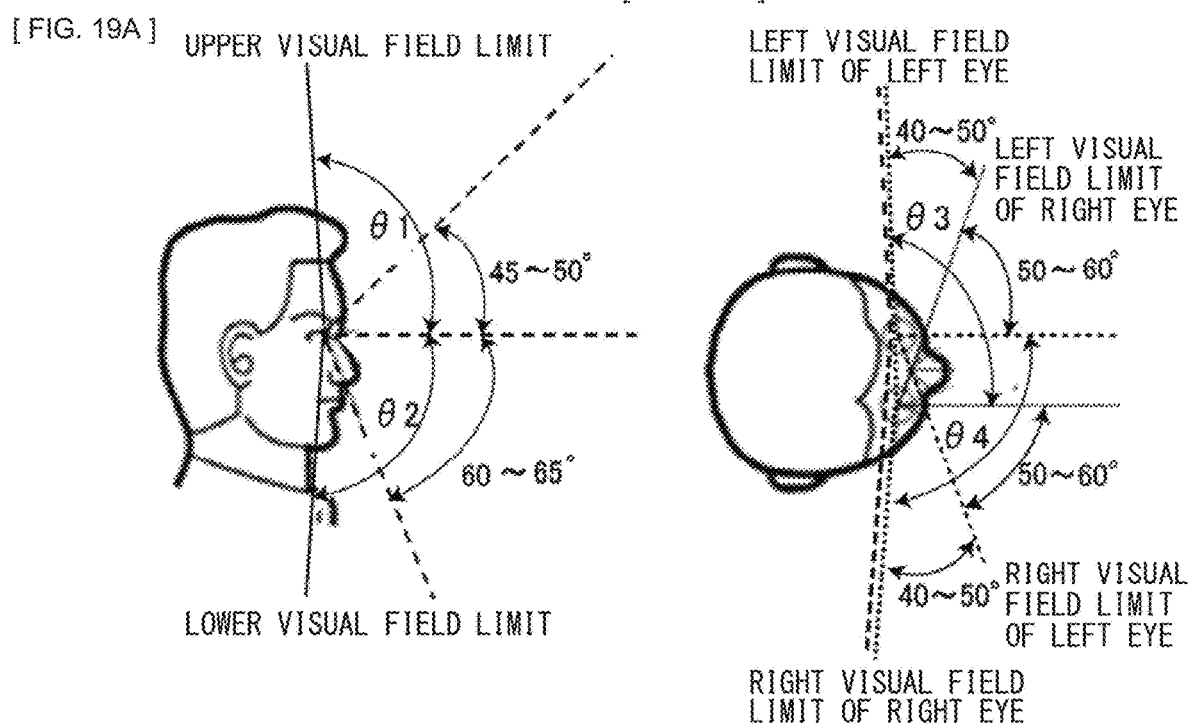

[ FIG. 20 ]
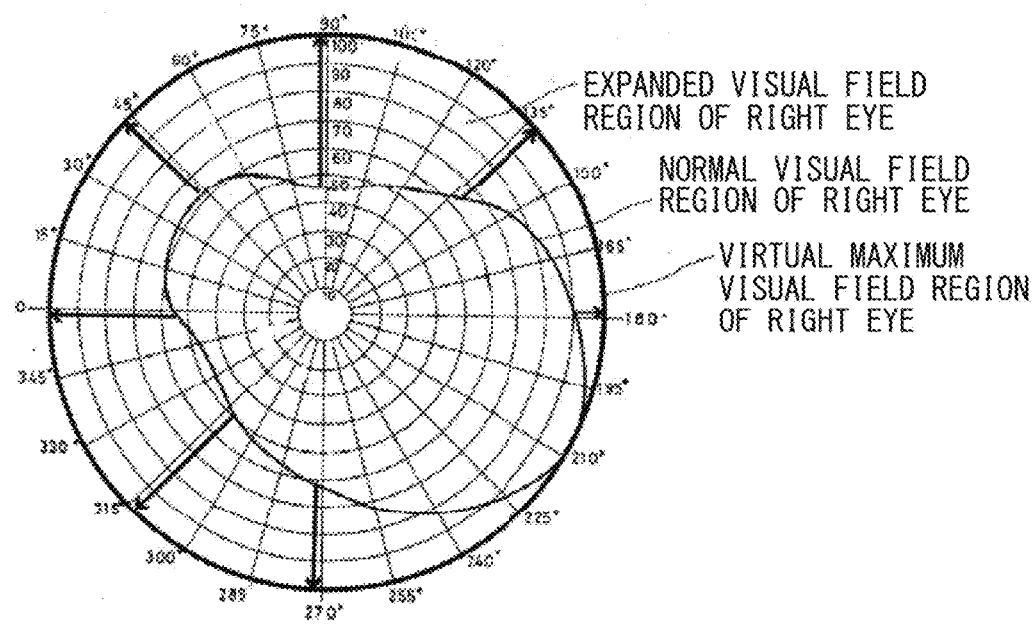

[ FIG. 21 ]
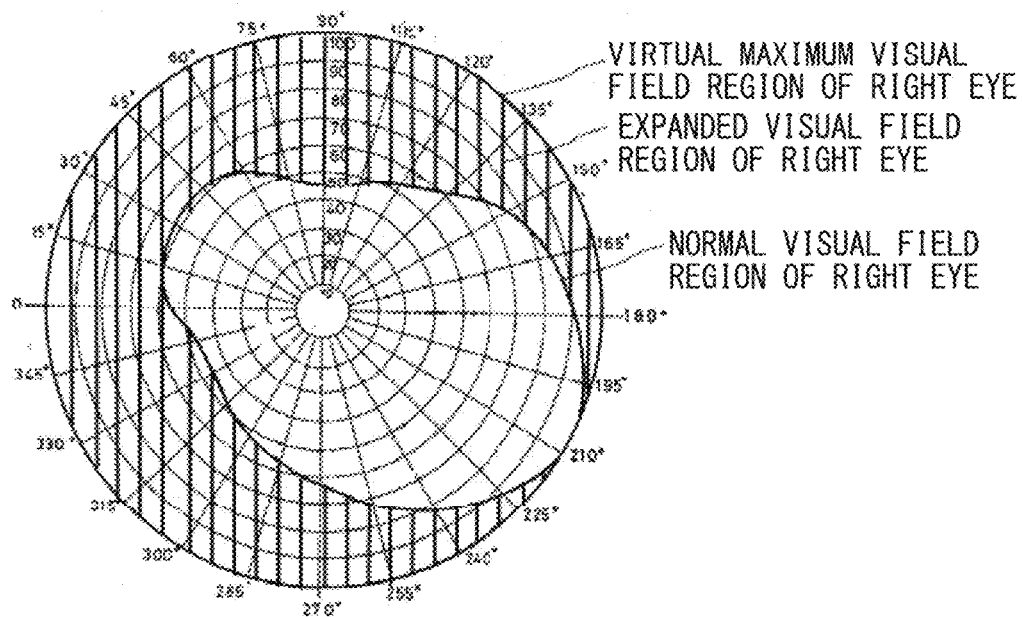

[FIG. 22]
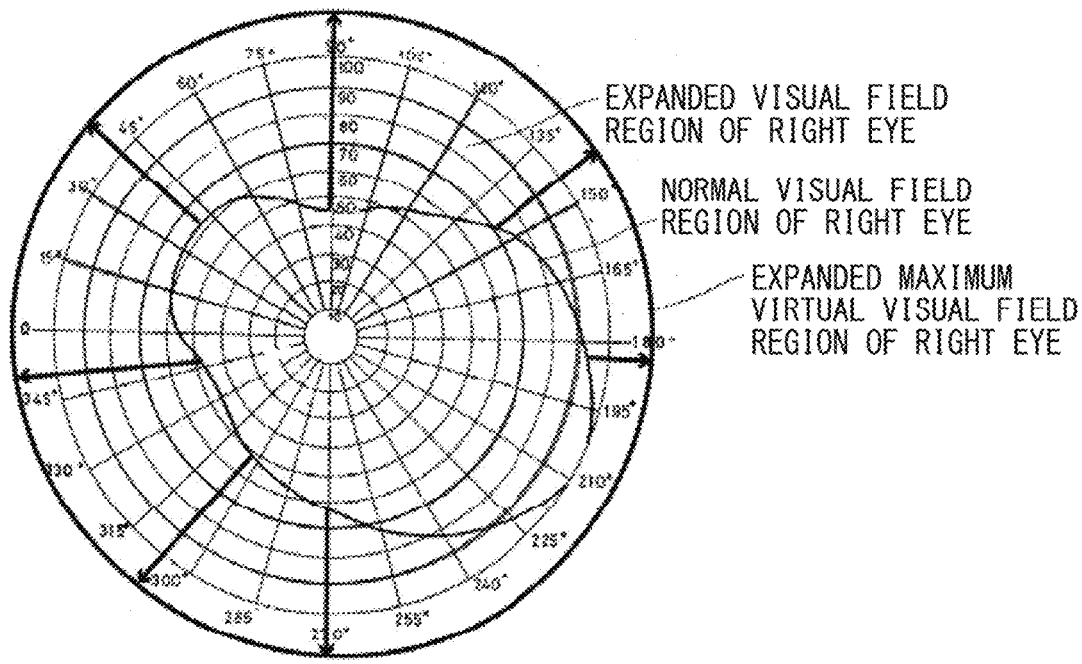

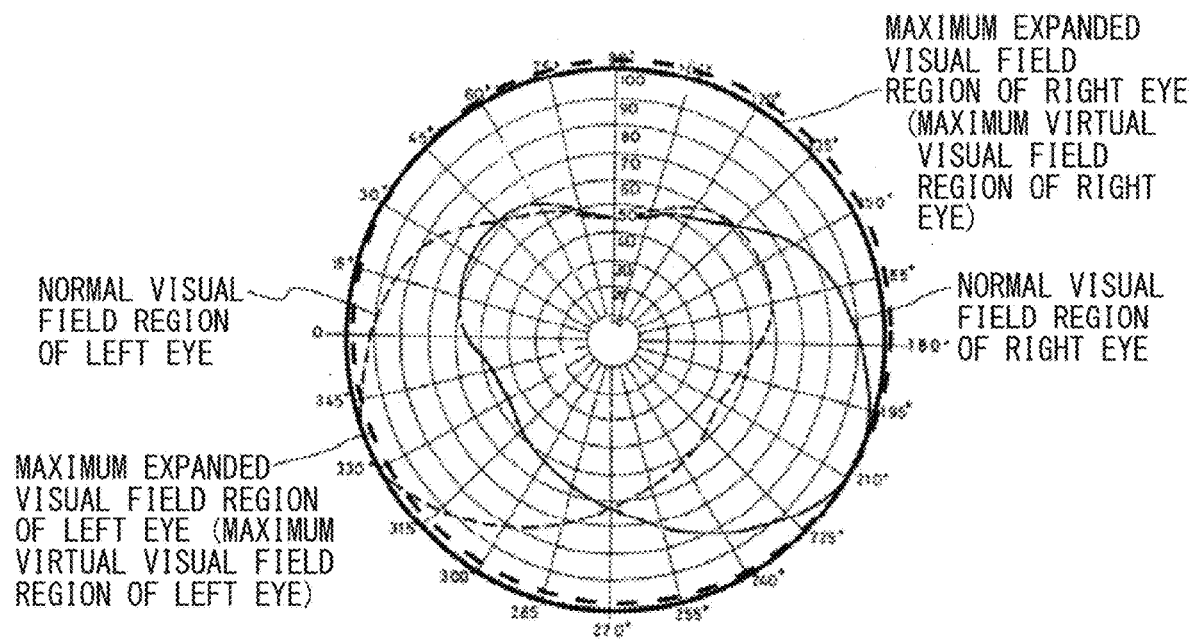
[ FIG. 23 ]

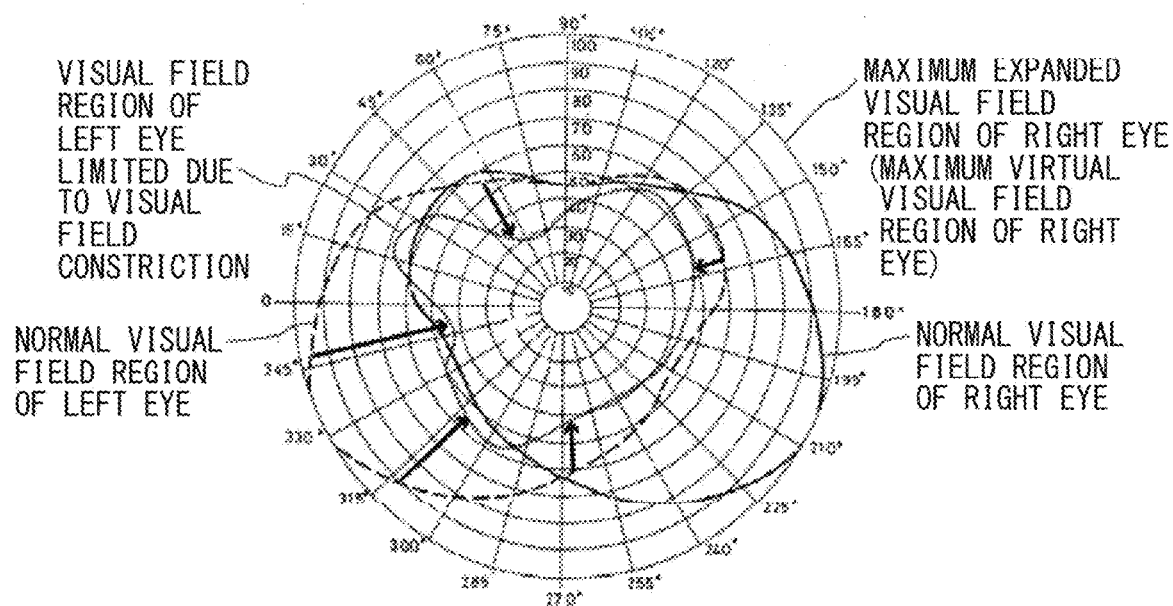
[FIG. 24]

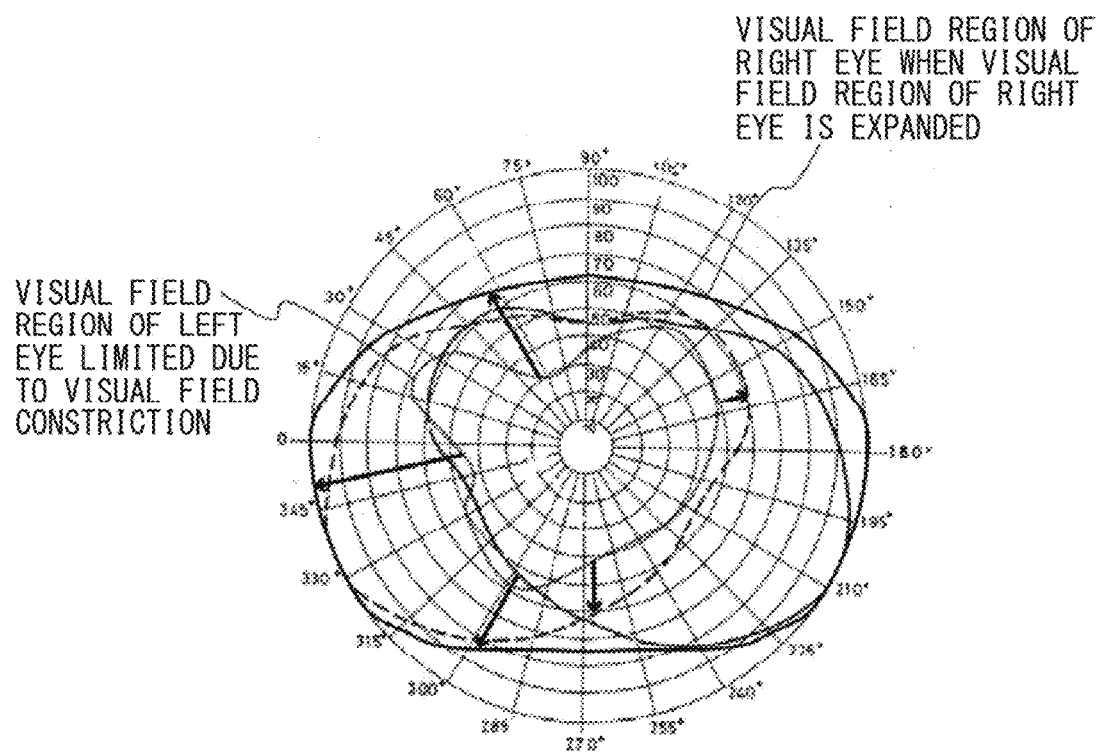
[ FIG. 25 ]

[FIG. 26]
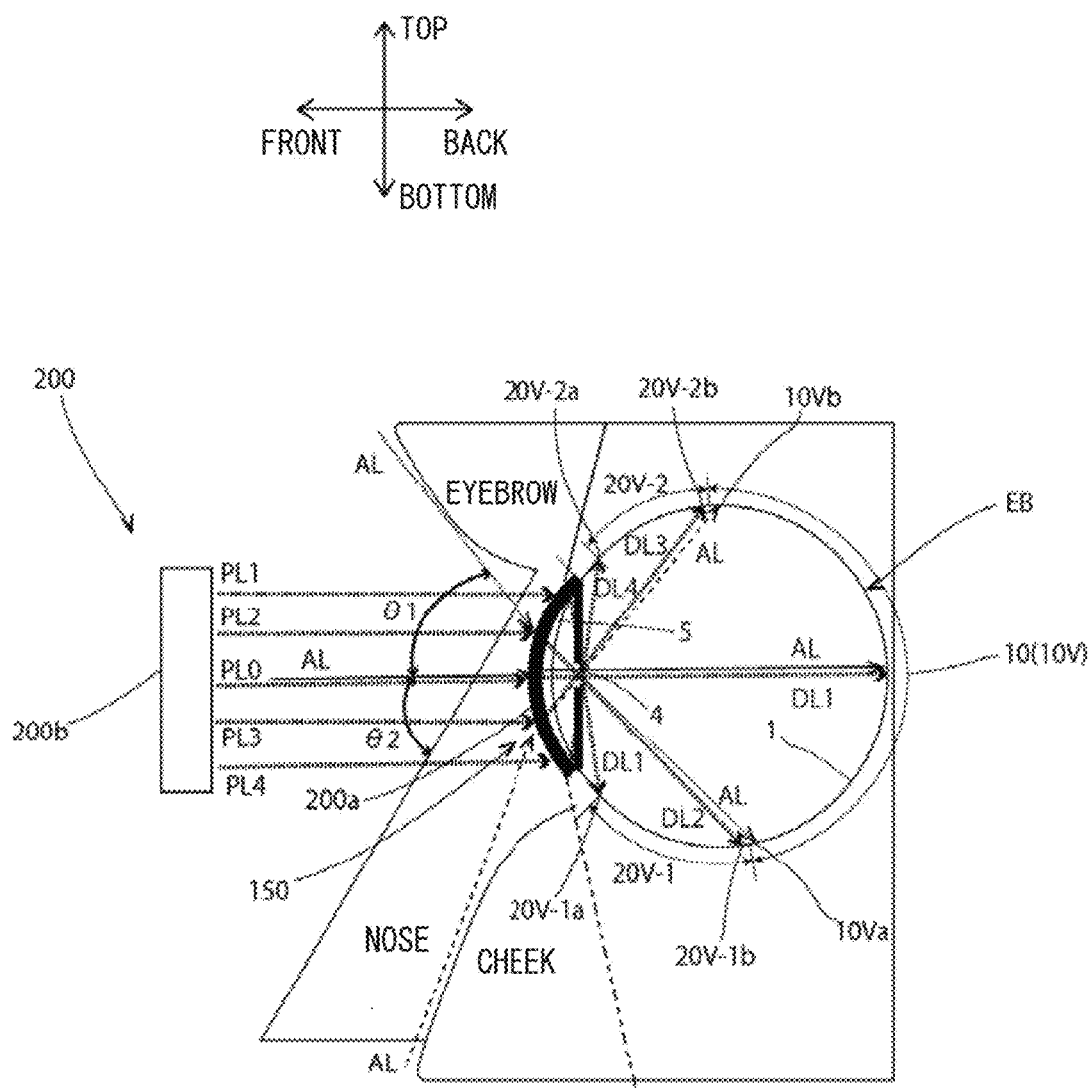

[ FIG. 27 ]
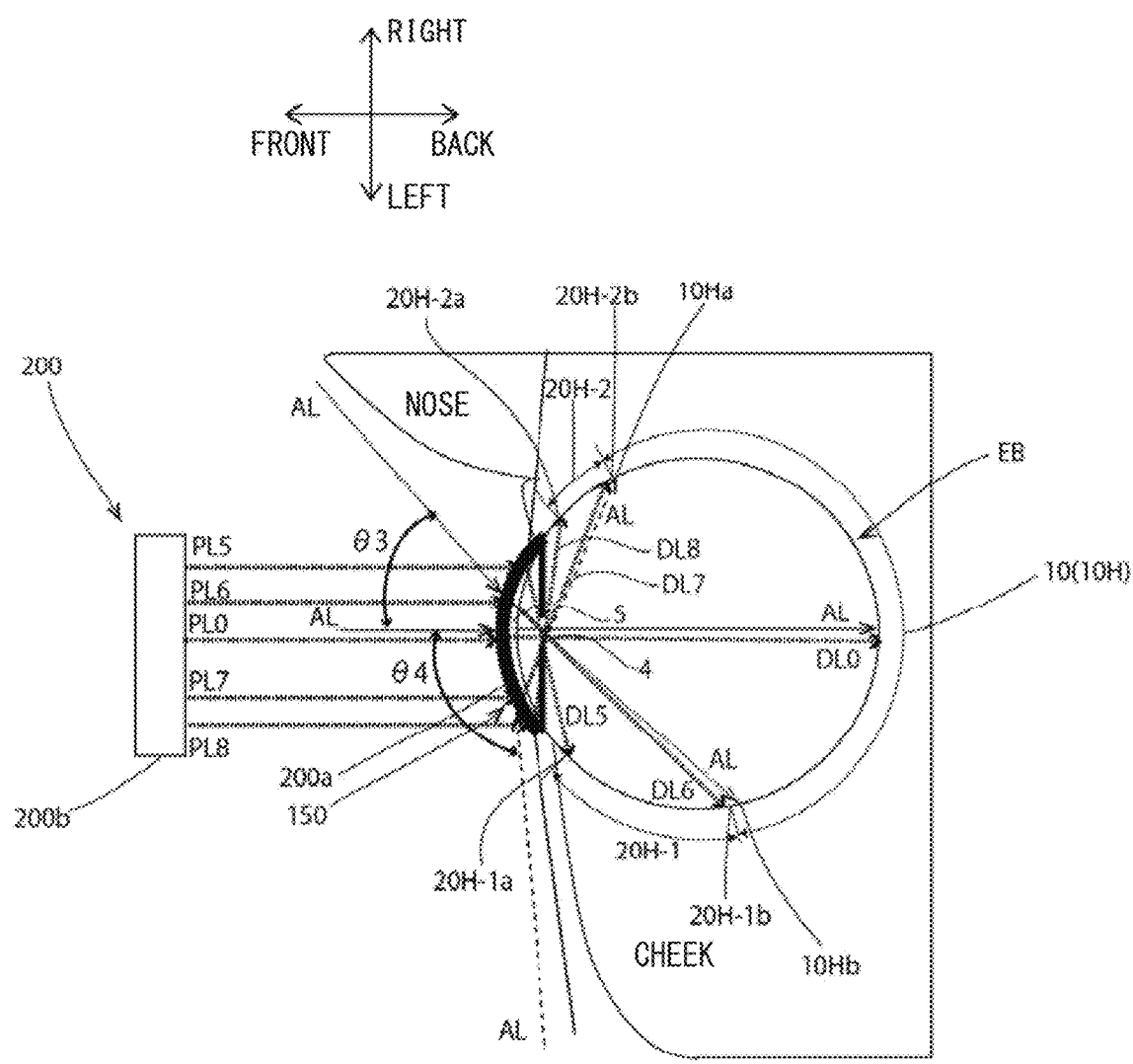

[FIG. 28]
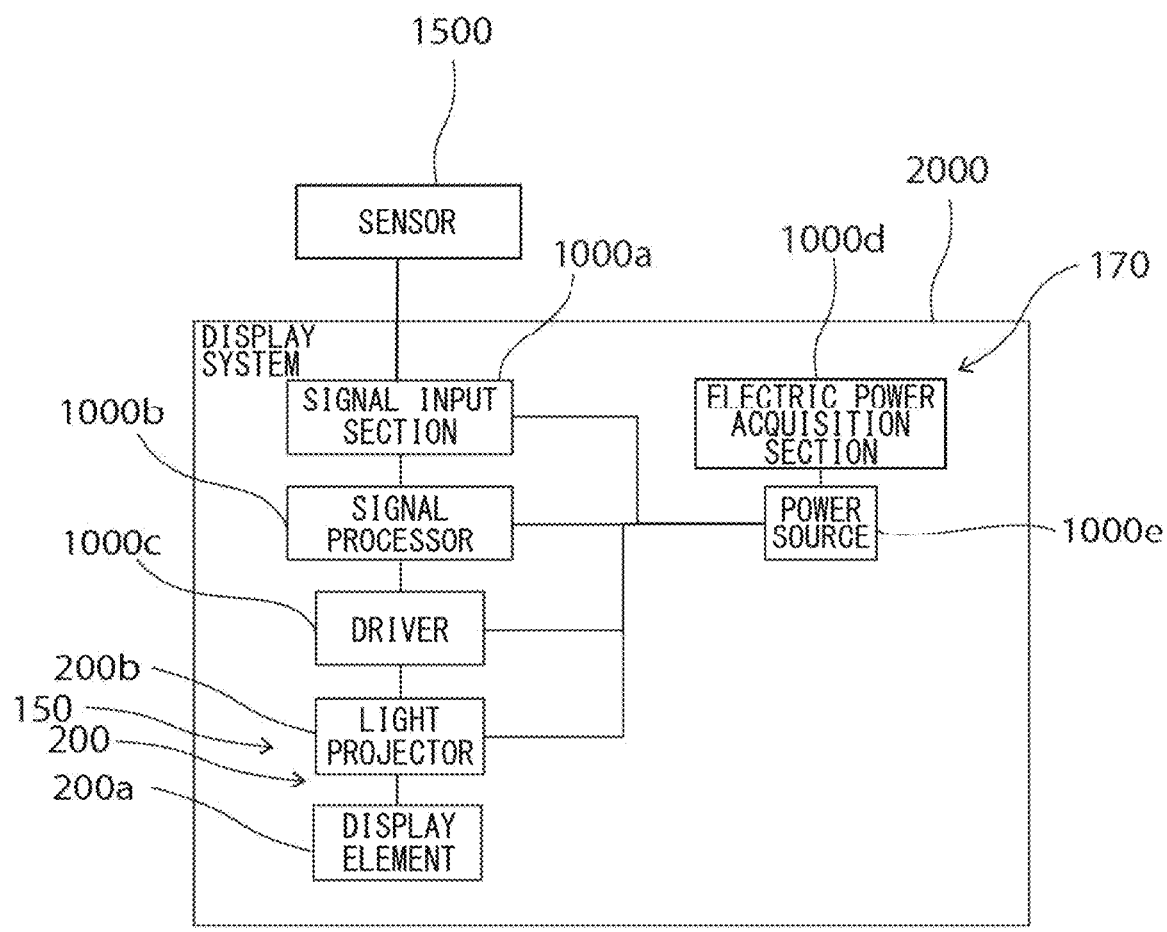

[FIG. 29]
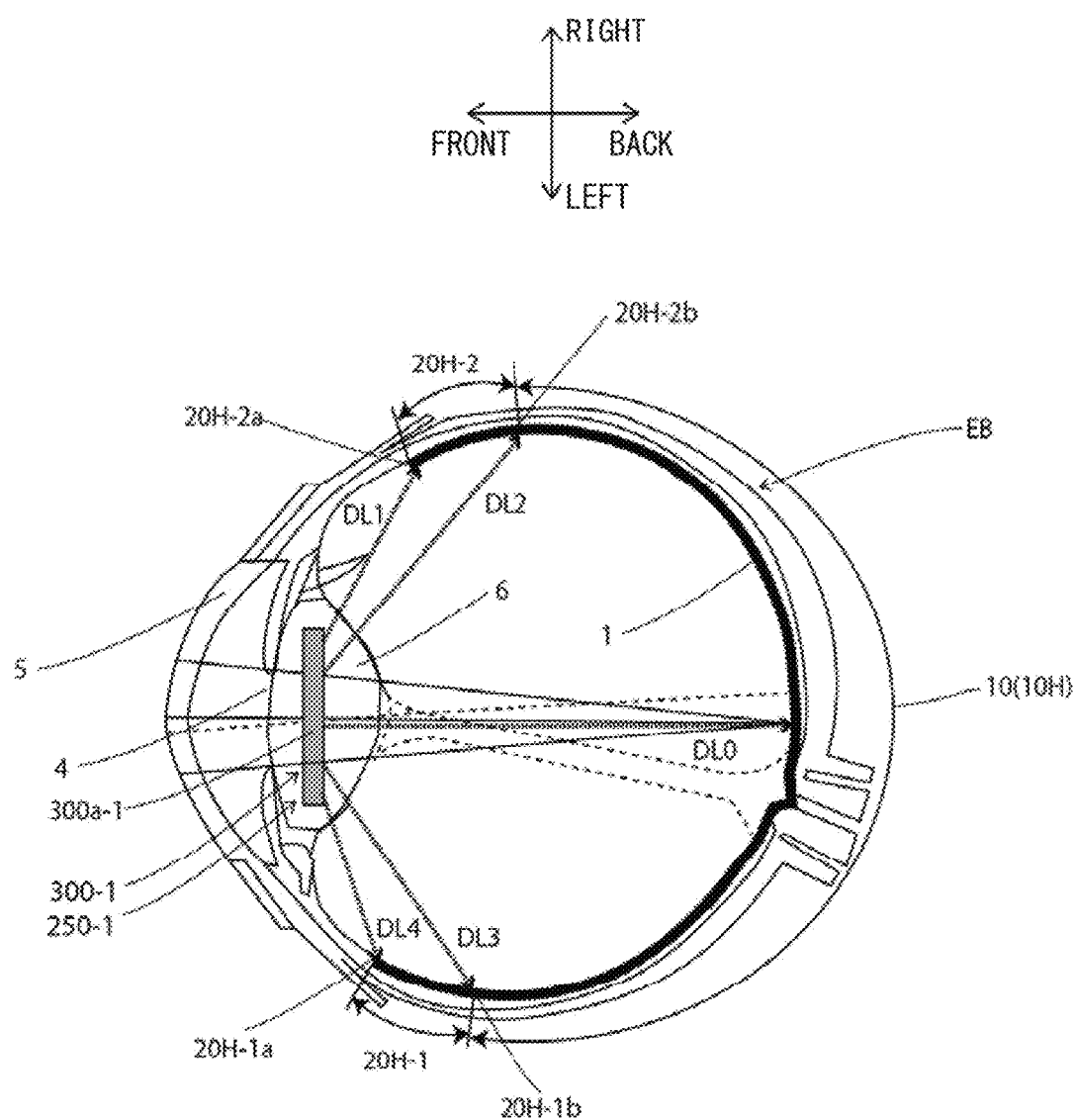

[ FIG. 30 ]
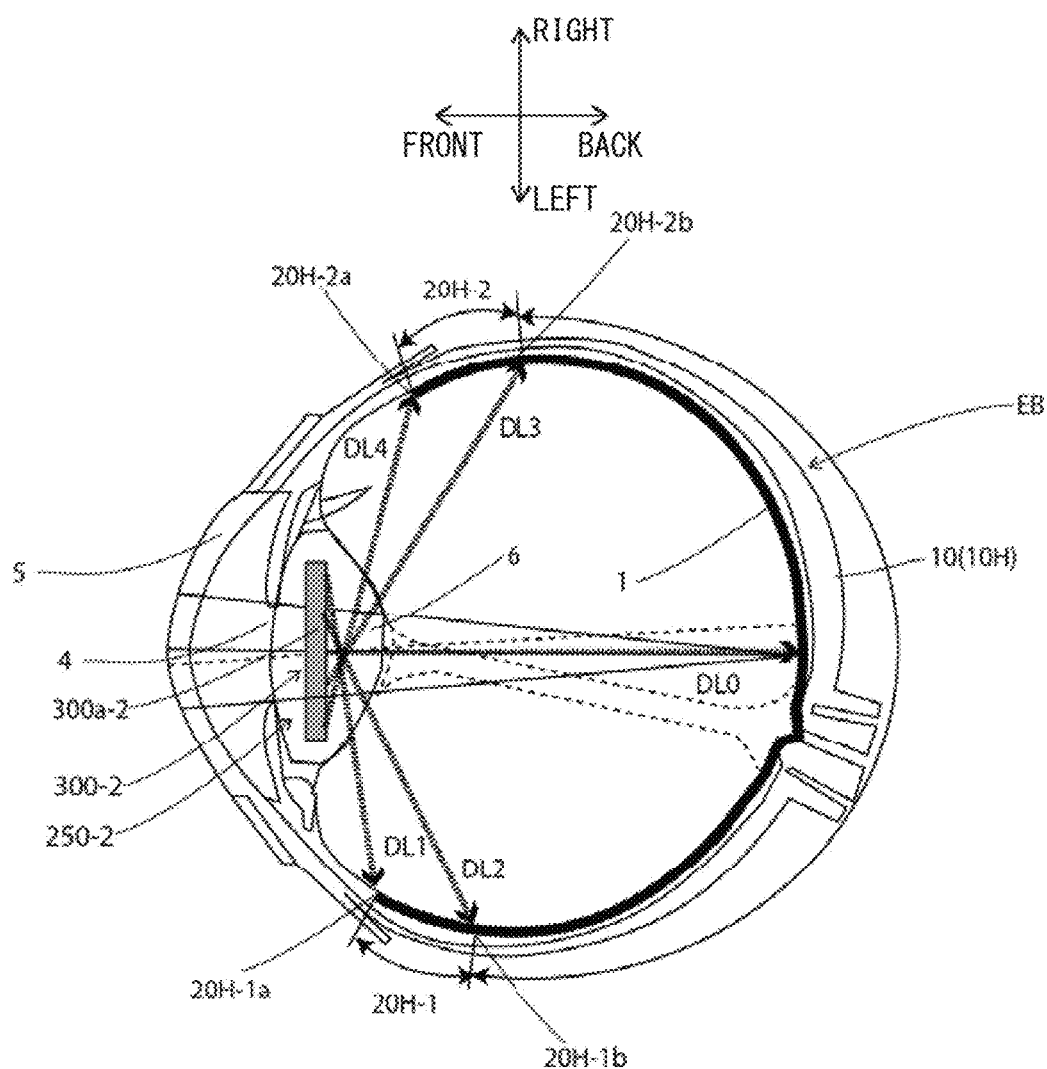

[ FIG. 31 ]
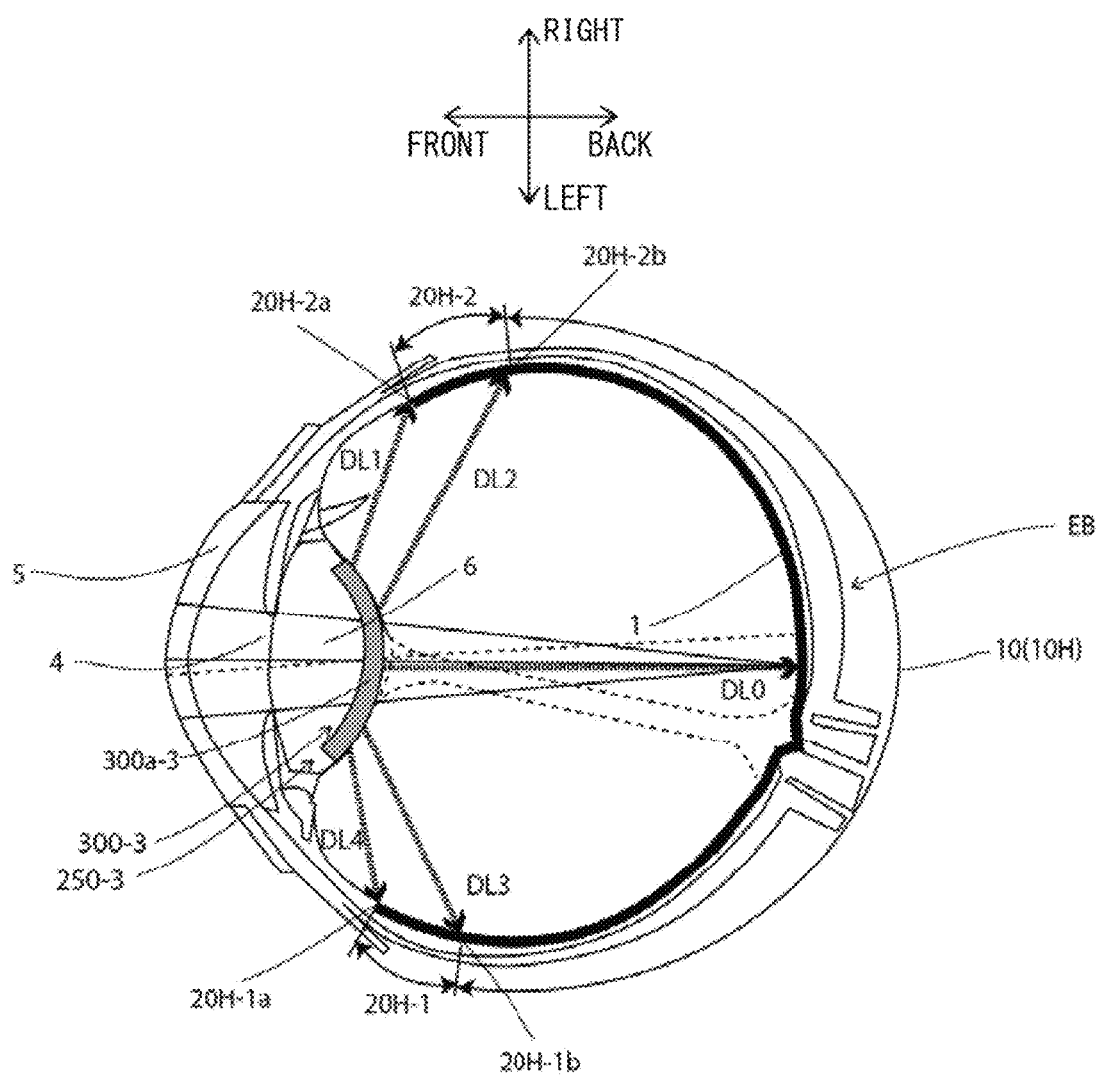

[ FIG. 32 ]
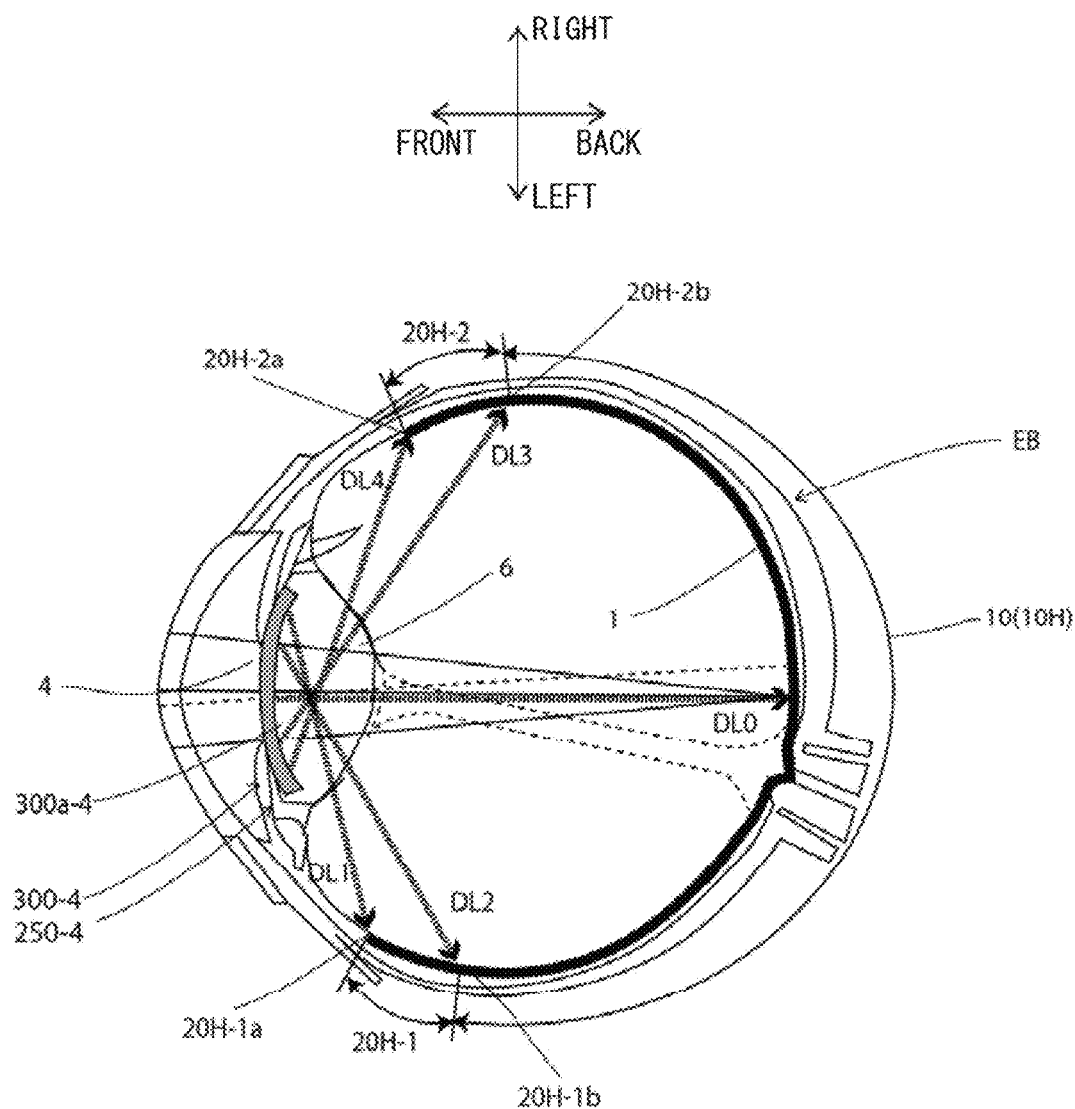

[FIG. 33]
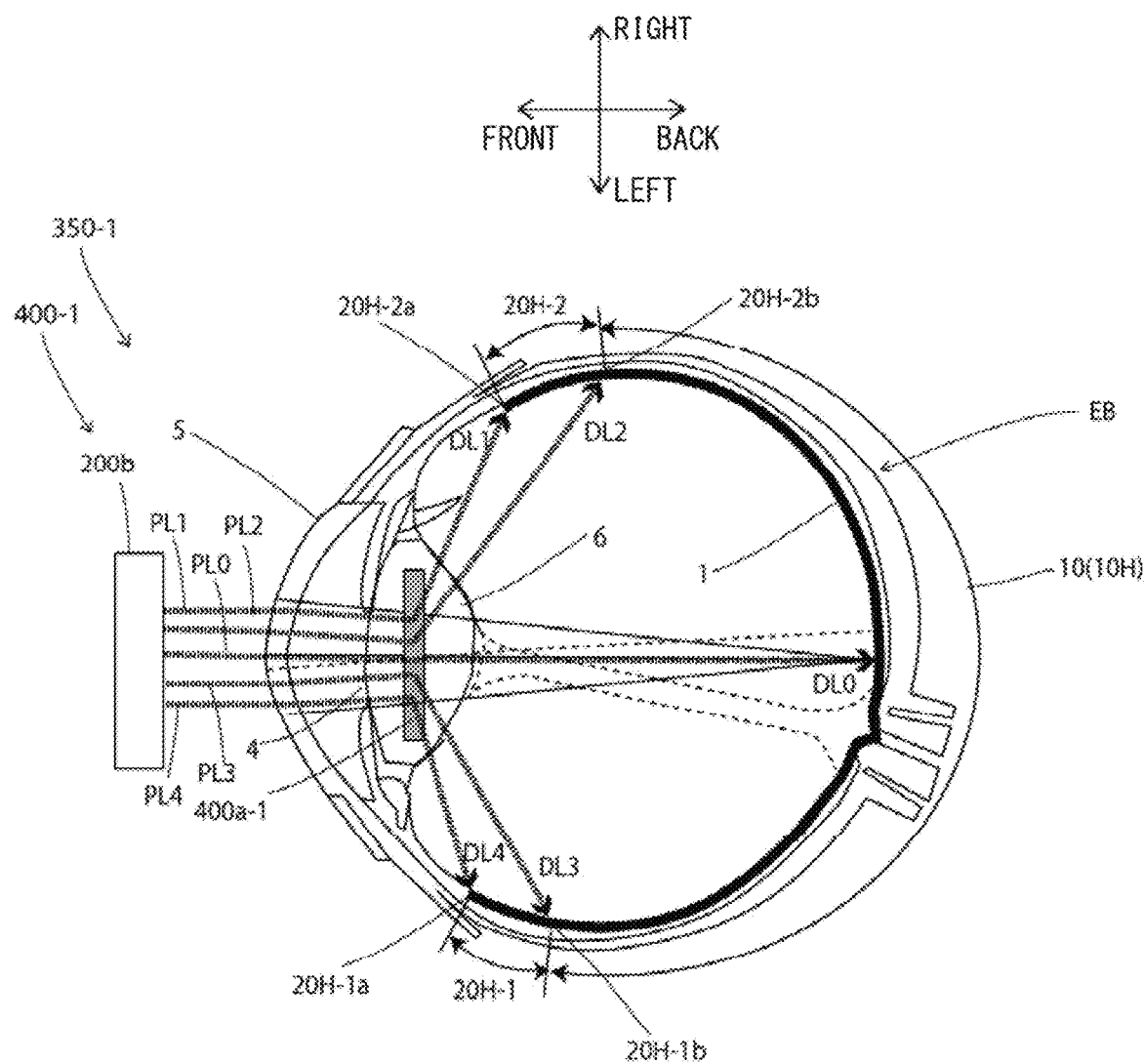

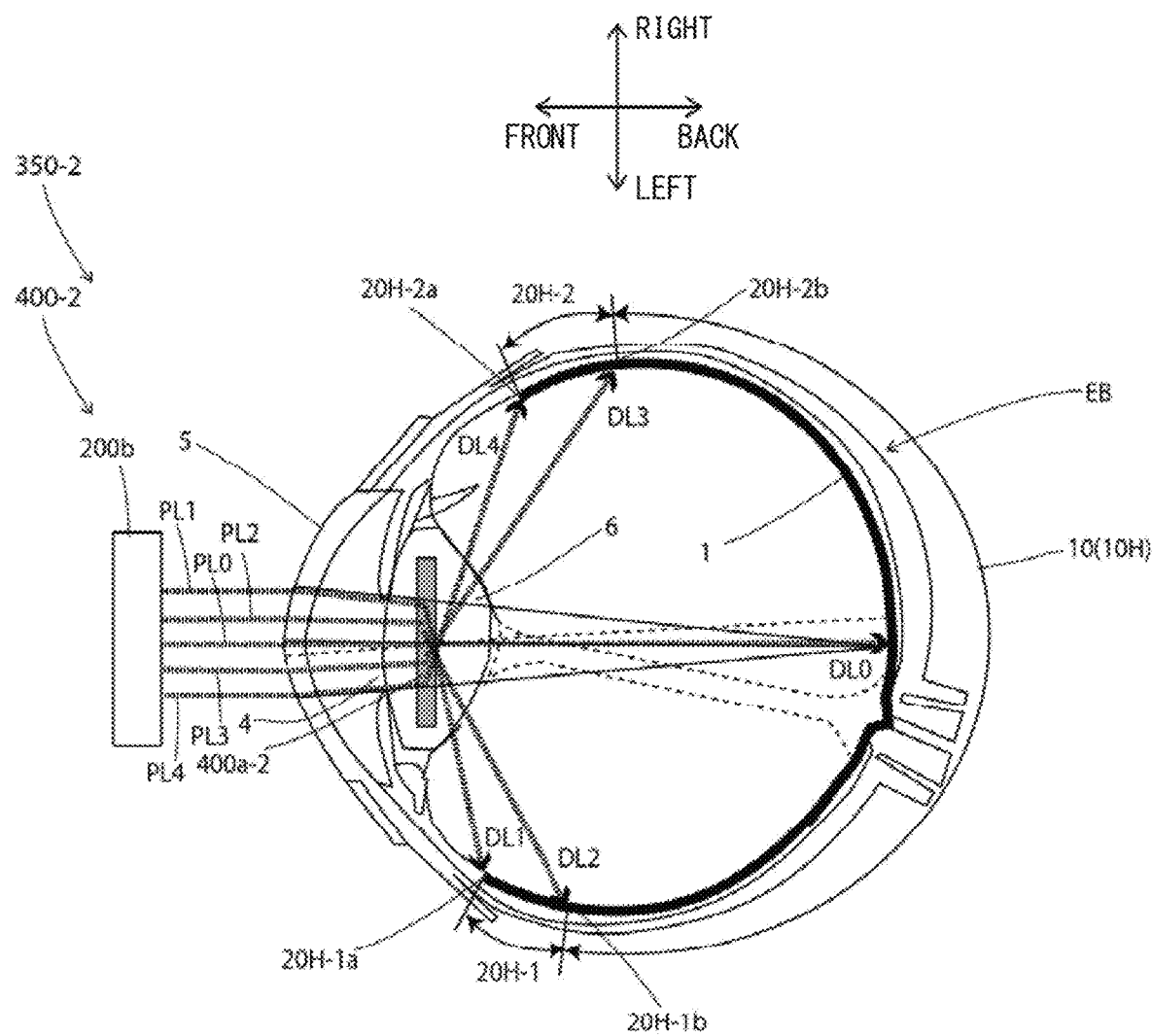
[FIG. 34]

[FIG. 35]
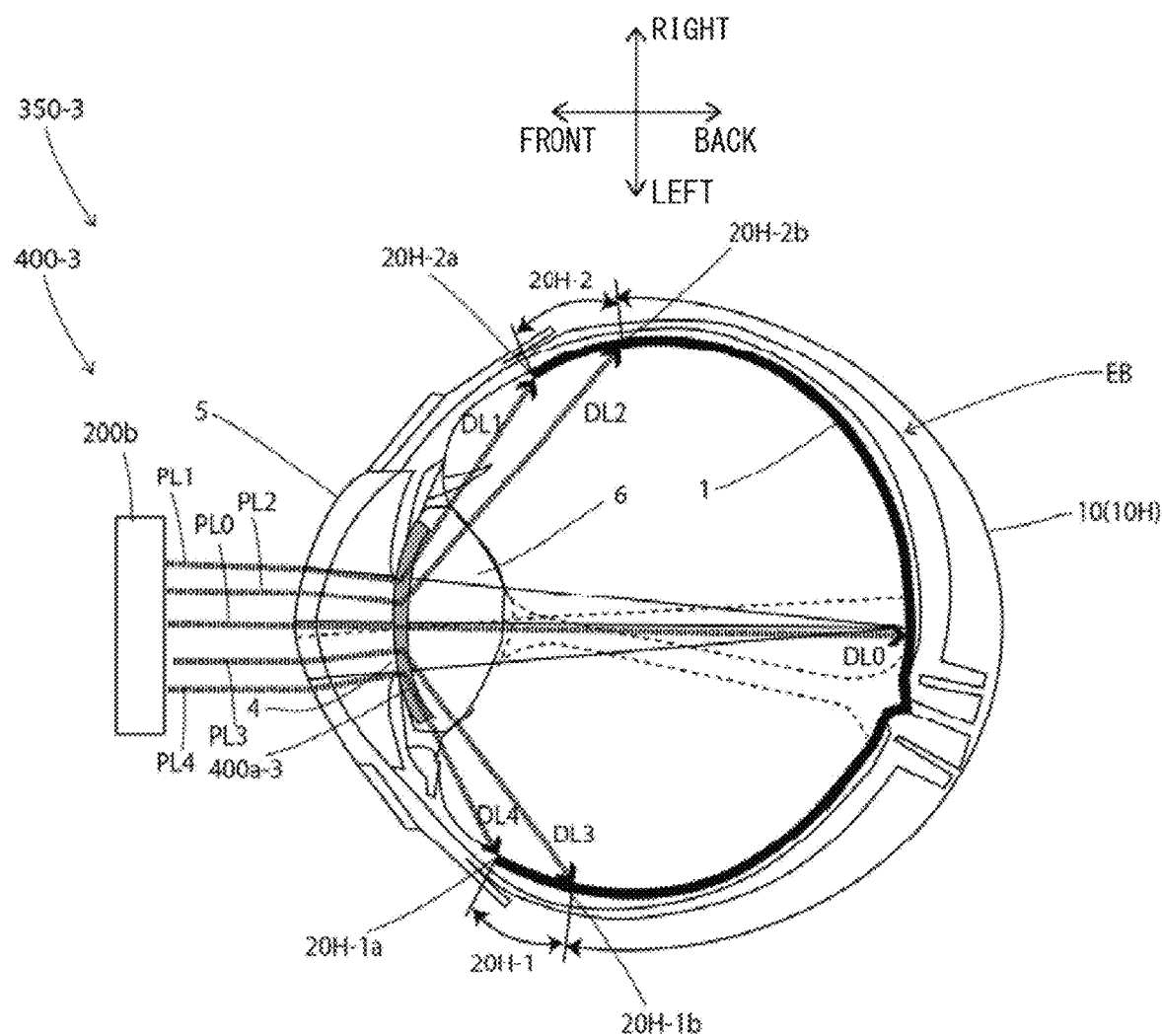

[FIG. 36]
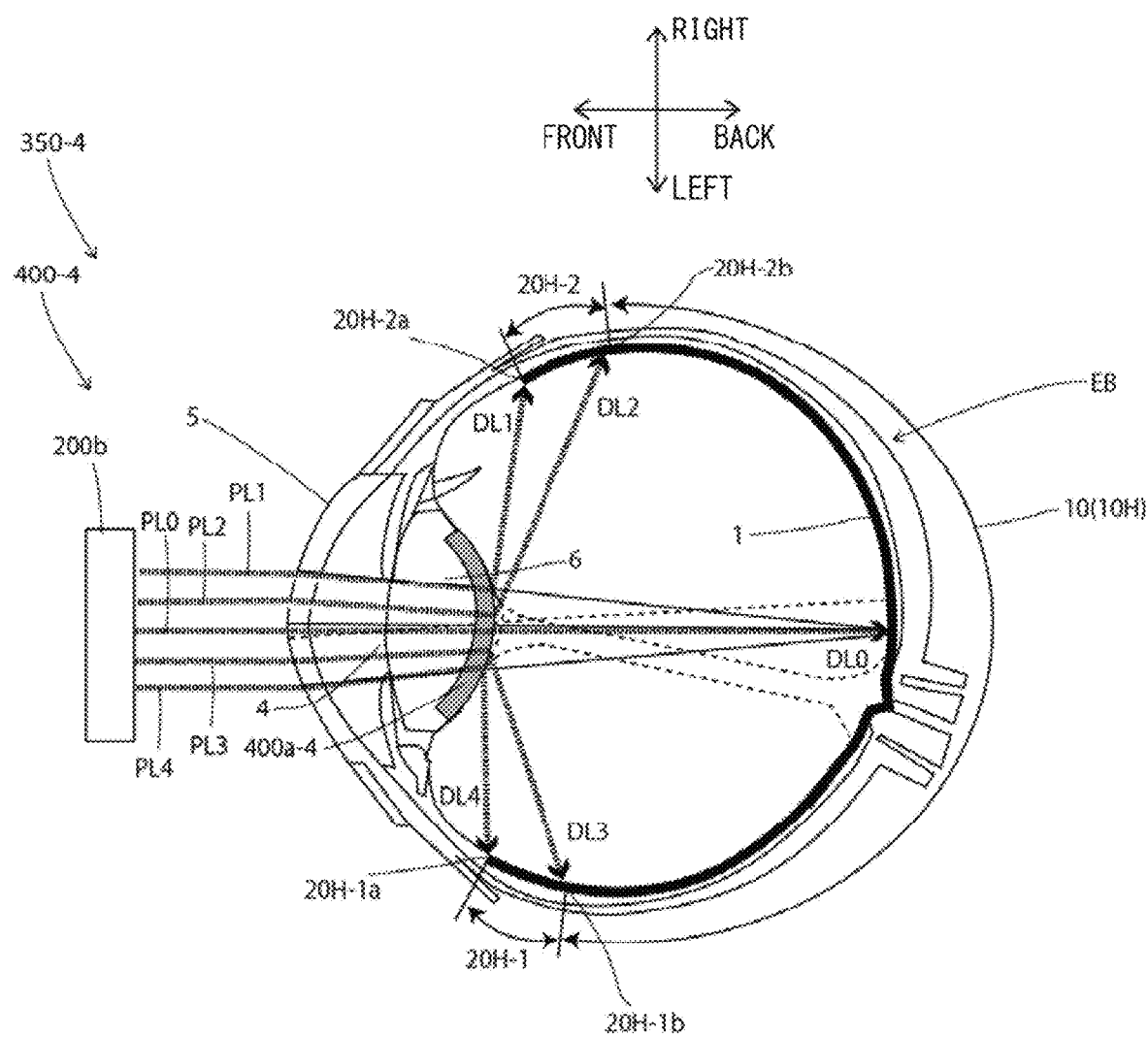

[ FIG. 37 ]
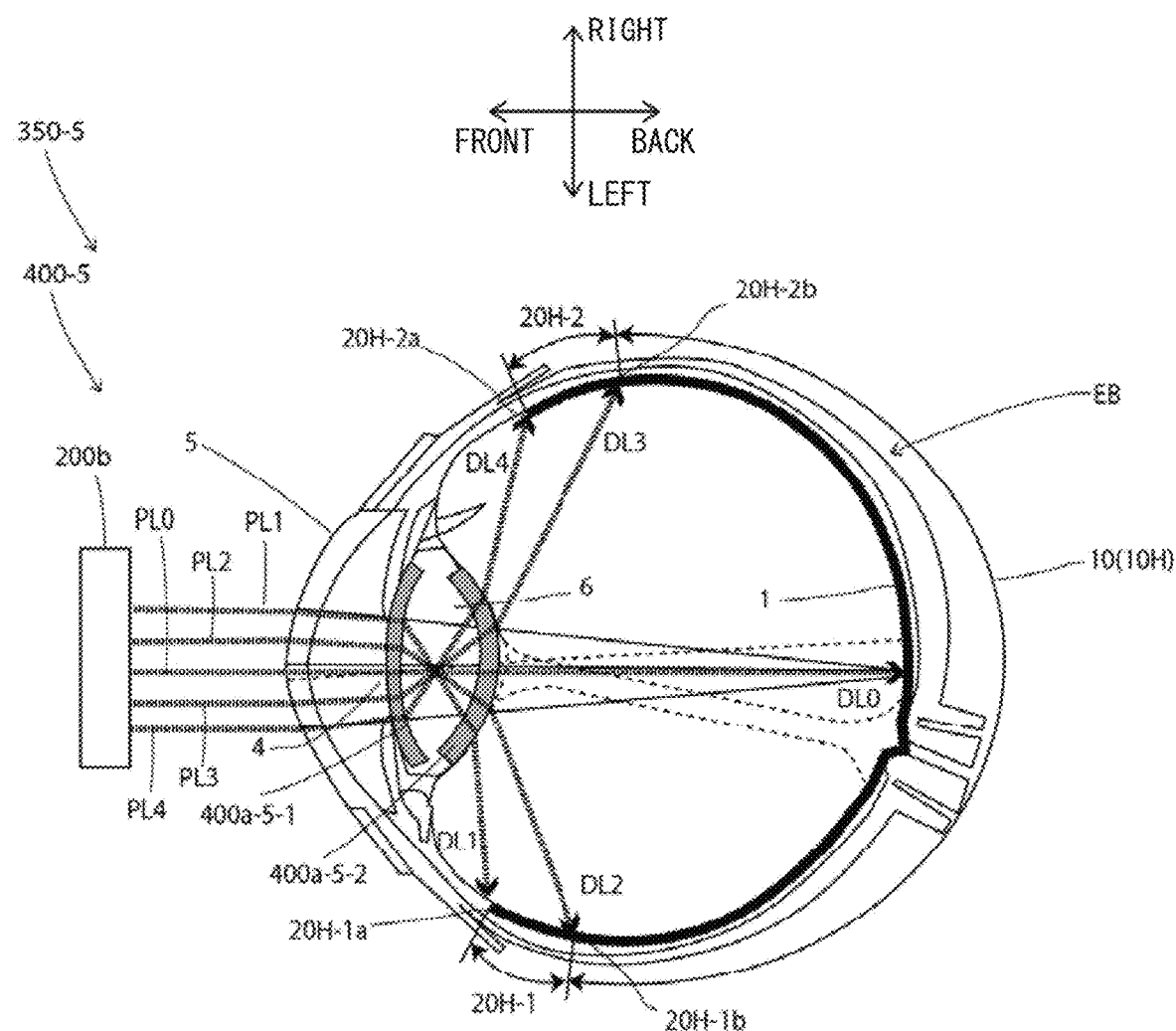

[ FIG. 38 ]
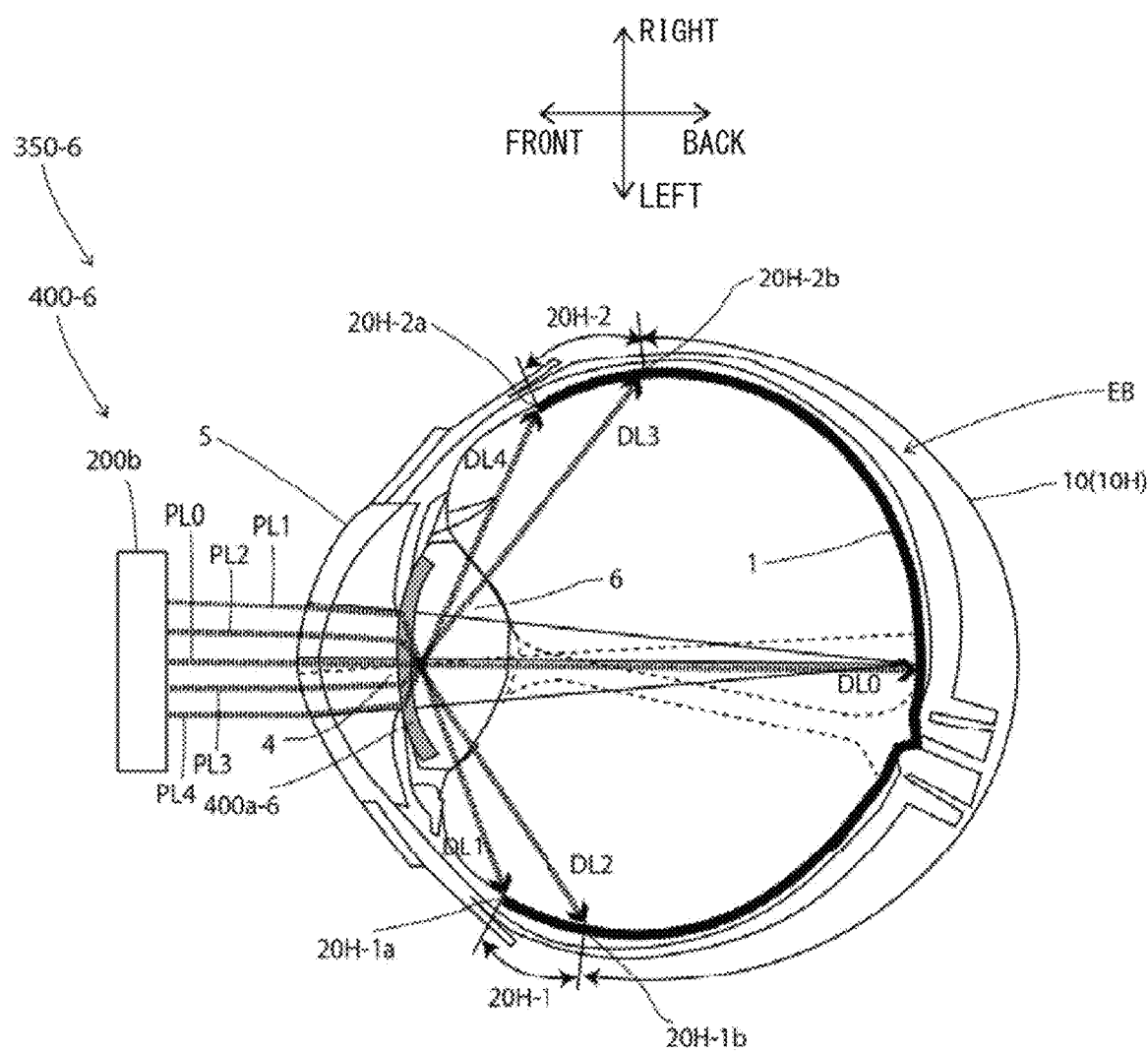

[ FIG. 39 ]
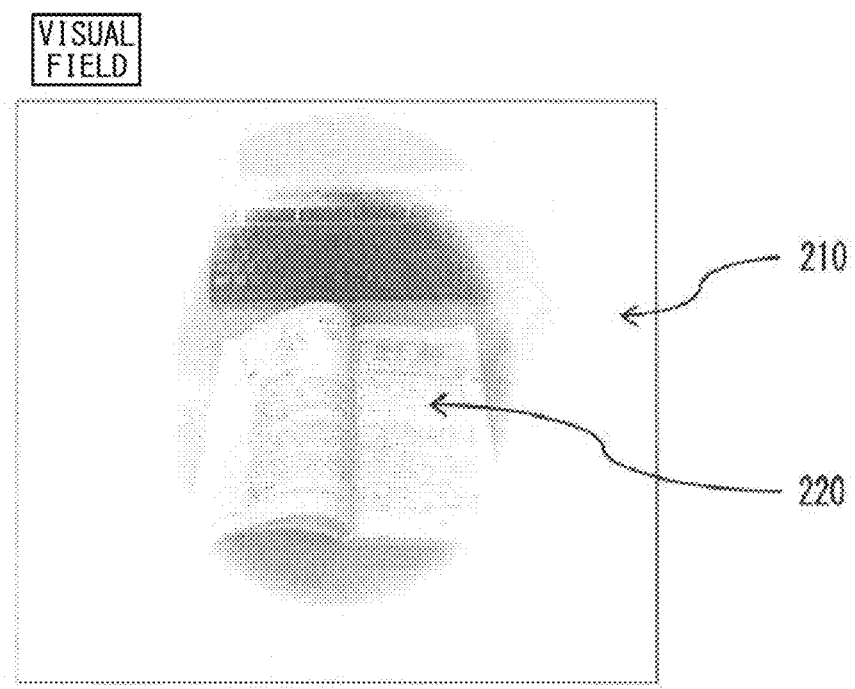

DISPLAY DEVICE AND DISPLAY SYSTEM

CROSS REFERENCE TO RELATED APPLICATIONS

This application is a U.S. National Phase of International Patent Application No. PCT/JP2020/041188 filed on Nov. 4, 2020, which claims priority benefit of Japanese Patent Application No. JP 2019-218358 filed in the Japan Patent Office on Dec. 2, 2019. Each of the above-referenced applications is hereby incorporated herein by reference in its entirety.

TECHNICAL FIELD

The technology according to the present disclosure (hereinafter also referred to as "the present technology") relates to a display device and a display system.

BACKGROUND ART

In recent years, techniques for improving human vision have been actively developed. For example, PTL 1 and PTL 2 each disclose a technique for improving a vision of a peripheral visual field by correcting aberrations of light rays reaching a peripheral visual field (a periphery of a visual field region).

CITATION LIST

Patent Literature

PTL 1: Japanese Unexamined Patent Application Publication No. 2014-209256
PTL 2: Japanese Unexamined Patent Application Publication (Published Japanese Translation of PCT Application) No. 2010-506240

SUMMARY OF THE INVENTION

Problems to be Solved by the Invention

However, the techniques disclosed in PTL 1 and PTL 2 have not been able to display information in a region larger than a visual field region and to cause the information to be visually recognized.

Accordingly, it is a main object of the present technology to provide a display device and a display system that are able to display information in a region larger than a visual field region and cause the information to be visually recognized.

Means for Solving the Problems

The present technology provides a display device including a light irradiation system configured to apply light on at least a region outside an ambient light irradiation region, within a larger region than the ambient light irradiation region, the larger region including the ambient light irradiation region, the ambient light irradiation region being a region in a retina on which ambient light is to be applied through a pupil.

The ambient light irradiation region may be determined by a part of a face around the retina that prevents the ambient light from reaching the retina, and/or an object mounted on the face or a head. The light irradiation system may be configured to apply light on either a region on a side of the pupil as seen from the ambient light irradiation region in the retina, or a region across the ambient light irradiation region and the region on the side of the pupil.

The light irradiation system may be configured to apply light selectively on any one of the ambient light irradiation region, a region on a side of the pupil of the ambient light irradiation region in the retina, and a region across the ambient light irradiation region and the region on the side of the pupil.

The light irradiation system may output light beams in a manner that the light beams intersect with each other in a vicinity of the pupil.

The light irradiation system may apply light on a region, of the retina of one eye, on a side opposite to a side of the other eye.

The light irradiation system may include a display element that is to be integrated with an eyeball at least while in use.

The display element may develop a viewing angle characteristic which, in a visual field region corresponding to a region larger than the ambient light irradiation region, leads to a lower visibility in a peripheral portion than in a center portion.

The display element may include a contact lens type display element.

The display element may include an intraocular lens type display element.

The display element may include a plurality of pixels arranged two-dimensionally or three-dimensionally.

The display element may have a transmitting section that transmits at least a portion of light having a specific wavelength, and a light-shielding section that shields the light.

The transmitting section may include a gap between the pixels.

The light-shielding section may include a gap between the pixels.

The transmitting section may include a wiring line disposed between the pixels.

The light-shielding section may include a wiring line disposed between the pixels.

The transmitting section may include a wiring line provided between pixel groups each including at least two pixels.

The light-shielding section may include a wiring line provided between pixel groups each including at least two pixels.

The display element may include the plurality of pixels disposed in a staggered arrangement.

The display device according to claim 7, in which the display element may include a self-luminous display element.

The display device according to claim 7, in which the display element may include a liquid crystal display and a light source.

The display device may further include a sensor that detects outside-of-normal-visual-field-region information which is information outside a normal visual field region corresponding to the ambient light irradiation region, and may display the outside-of-normal-visual-field-region information detected by the sensor on an expanded visual field region corresponding to the larger region.

The light irradiation system may include an optical element that is to be integrated with an eyeball at least while in use, and a light projector that projects light toward the optical element.

The optical element may develop a viewing angle characteristic which, in a visual field region corresponding to a region larger than the ambient light irradiation region, leads to a lower visibility in a peripheral portion than in a center portion.

The optical element may include a contact lens type optical element.

The optical element may include an intraocular lens type optical element.

The present technology also provides a display system including the display device and a control device that controls the display device.

BRIEF DESCRIPTION OF DRAWINGS

FIGS. 1A and 1B FIG. 1A is a diagram for explaining an existing visual field region in a vertical direction. FIG. 1B is a diagram for explaining an existing visual field region in a horizontal direction.

FIG. 2 is a horizontal cross-sectional view of an eyeball.

FIG. 3A is a schematic front view of a skull. FIG. 3B is a schematic right side view of the skull.

FIG. 4 is a diagram for explaining an ambient light irradiation region in a vertical direction in a retina.

FIG. 5 is a diagram for explaining an ambient light irradiation region in a horizontal direction in the retina.

FIG. 6 is a viewing angle distribution map indicating normal visual field regions of both eyes.

FIG. 7 is a vertical cross-sectional view of a state in which light is applied on the retina from a display element mounted on the eyeball in a display device according to a first embodiment of the present technology.

FIG. 8 is a horizontal cross-sectional view of the state in which the light is applied on the retina from the display element mounted on the eyeball in the display device according to the first embodiment of the present technology.

FIG. 9 is a cross-sectional view of a configuration example 1 of the display element of the display device according to the first embodiment of the present technology.

FIG. 10 is a cross-sectional view of a configuration example 2 of the display element of the display device according to the first embodiment of the present technology.

FIG. 11 is a diagram illustrating a pixel arrangement example 1 of the display element.

FIG. 12 is a diagram illustrating a pixel arrangement example 2 of the display element.

FIG. 13 is a diagram illustrating a pixel arrangement example 3 of the display element.

FIG. 14 is a diagram illustrating a pixel arrangement example 4 of the display element.

FIG. 15 is a diagram illustrating a pixel arrangement example 5 of the display element.

FIG. 16 is a diagram illustrating a pixel arrangement example 6 of the display element.

FIG. 17 is a diagram illustrating a pixel arrangement example 7 of the display element.

FIG. 18 is a block diagram illustrating an example of a function of a display system including the display device according to the first embodiment of the present technology.

FIG. 19A is a diagram illustrating an expanded visual field region that is larger than the normal visual field region in the vertical direction, in which information may be displayed by the display device according to the first embodiment of the present technology. FIG. 19B is a diagram illustrating an expanded visual field region that is larger than the normal visual field region in the horizontal direction, in which information may be displayed by the display device according to the first embodiment of the present technology.

FIG. 20 is a diagram illustrating an expanded visual field region of a right eye with arrows, in which information may be displayed by the display device of the present technology.

FIG. 21 is a diagram illustrating the expanded visual field region of the right eye in terms of area, in which information may be displayed by the display device of the present technology.

FIG. 22 is a diagram illustrating an expanded maximum virtual visual field region of the right eye and the expanded visual field region of the right eye, in which information may be displayed by the display device of the present technology.

FIG. 23 is a diagram illustrating a maximum expanded visual field region of the both eyes.

FIG. 24 is a diagram illustrating a visual field region of the both eyes in a case where the left eye has visual field constriction.

FIG. 25 is a diagram illustrating a visual field region of the both eyes in a case where the left eye has visual field constriction and where a visual field region of the right eye is expanded by the display device of the present technology.

FIG. 26 is a vertical cross-sectional view of a state in which light projected from a light projector is applied on the retina through an optical element mounted on the eyeball in a display device according to a second embodiment of the present technology.

FIG. 27 is a horizontal cross-sectional view of the state in which the light projected from the light projector is applied on the retina through the optical element mounted on the eyeball in the display device according to the second embodiment of the present technology.

FIG. 28 is a block diagram illustrating an example of a function of a display system including the display device according to the second embodiment of the present technology.

FIG. 29 is a horizontal cross-sectional view of a state in which light is applied on the retina from a display element embedded in the eyeball in a display device according to a working example 1 of a third embodiment of the present technology.

FIG. 30 is a horizontal cross-sectional view of a state in which light is applied on the retina from a display element embedded in the eyeball in a display device according to a working example 2 of the third embodiment of the present technology.

FIG. 31 is a horizontal cross-sectional view of a state in which light is applied on the retina from a display element embedded in the eyeball in a display device according to a working example 3 of the third embodiment of the present technology.

FIG. 32 is a horizontal cross-sectional view of a state in which light is applied on the retina from a display element embedded in the eyeball in a display device according to a working example 4 of the third embodiment of the present technology.

FIG. 33 is a horizontal cross-sectional view of a state in which light is applied on the retina from a display element embedded in the eyeball in a display device according to a working example 1 of a fourth embodiment of the present technology.

FIG. 34 is a horizontal cross-sectional view of a state in which light is applied on the retina from a display element embedded in the eyeball in a display device according to a working example 2 of the fourth embodiment of the present technology.

FIG. 35 is a horizontal cross-sectional view of a state in which light is applied on the retina from a display element embedded in the eyeball in a display device according to a working example 3 of the fourth embodiment of the present technology.

FIG. 36 is a horizontal cross-sectional view of a state in which light is applied on the retina from a display element embedded in the eyeball in a display device according to a working example 4 of the fourth embodiment of the present technology.

FIG. 37 is a horizontal cross-sectional view of a state in which light is applied on the retina from a display element embedded in the eyeball in a display device according to a working example 5 of the fourth embodiment of the present technology.

FIG. 38 is a horizontal cross-sectional view of a state in which light is applied on the retina from a display element embedded in the eyeball in a display device according to a working example 6 of the fourth embodiment of the present technology.

FIG. 39 is a diagram illustrating an example of an expanded visual field region when light is applied on the retina from the display device of the present technology.

MODES FOR CARRYING OUT THE INVENTION

The following describes preferred embodiments of the present technology in detail with reference to the accompanying drawings. In the present specification and drawings, components having substantially the same functional configurations are denoted by the same reference numerals, and a repetitive description thereof is omitted. The embodiments described below are illustration of exemplary embodiments of the present technology and are not to be construed as limiting the scope of the present technology. In this specification, each of a display device and a display system according to the present technology may have at least one effect even in a case where it is described that each of the display device and the display system according to the present technology has a plurality of effects. The effects described herein are merely illustrative and not restrictive, and may have other effects.

Further, description is given in the following order.
1. Introduction
2. Normal visual field region
3. Ambient light irradiation region
4. Display Device and Display System Including Display Device According to First Embodiment of the Present Technology
5. Display Device and Display System Including Display Device According to Second Embodiment of the Present Technology
6. Display Device According to Third Embodiment of the Present Technology
7. Display Device According to Fourth Embodiment of the Present Technology
8. Display Device According to Fifth Embodiment of the Present Technology 1. <Introduction>

A human visual field region is usually limited by angle of a light beam of ambient light that may enter retinas of both eyes. Here, the ambient light means, for example, natural light such as sunlight, artificial light such as illumination light, or the like.

Most people rely on visual information within this certain visual field region to perform a variety of activities.

However, for example, in a case of visual field constriction, or in a case of wearing equipment such as eyeglasses, a helmet, an eye bandage, or the like, the visual field region is further limited, and thus there is a possibility that the activity is disturbed in some way.

Further, even in a normal case where the visual field region is secured, it is possible to recognize presence or absence of an obstacle or the like in a larger region if information outside the visual field region is visually recognizable, which has an advantage in that it is possible to improve security.

Therefore, the inventor has conducted intensive studies and developed a display device of the present technology as a display device that is able to display information in a region larger than the visual field region and to cause the information to be visually recognized.

2. <Normal Visual Field Region>

In the following description, a direction from a rear side to a front side of a face is defined as a forward direction, a direction from the front side to the rear side of the face is defined as a rearward direction, a direction from an upper side to a lower side of the face is defined as a downward direction, a direction from the lower side to the upper side of the face is defined as an upward direction, a direction from a left side to a right side of the face is defined as a rightward direction, and a direction from the right side to the left side of the face is defined as a leftward direction.

The normal visual field region of each eye in the vertical direction (for example, a perpendicular direction, the same applies hereinafter) may be defined, for example, as illustrated in FIG. 1A, as a region between an upper visual field limit and a lower visual field limit. The upper visual field limit is a direction in which the ambient light having an angle of, for example, 65° (entering at the angle of 65°), upward with respect to a line-of-sight direction facing front. The lower visual field limit is a direction in which the ambient light having an angle of, for example, 75° (entering at the angle of 75°), downward with respect to the line-of-sight direction.

The normal visual field region of the right eye in the horizontal direction (for example, a lateral direction, the same applies hereinafter) may be defined, for example, as illustrated in FIG. 1B, as a region between a right visual field limit and a left visual field limit. The right visual field limit is a direction in which the ambient light having an angle of, for example, 100° (entering at the angle of) 100°, toward the rightward direction with respect to the line-of-sight direction facing front. The left visual field limit is a direction in which the ambient light having an angle of, for example, 60° (entering at the angle of 60°), toward the leftward direction with respect to the line-of-sight direction.

The normal visual field region of the left eye in the horizontal direction may be defined, for example, as illustrated in FIG. 1B, as a region between a left visual field limit and a right visual field limit. The left visual field limit is a direction in which the ambient light having an angle of, for example, 100° (entering at the angle of 100°), toward the leftward direction with respect to the line-of-sight direction facing front. The right visual field limit is a direction in which the ambient light having an angle of, for example, 60° (entering at the angle of 60°), toward the rightward direction with respect to the line-of-sight direction.

Incidentally, as illustrated in FIG. 2 (excerpted from "Sense, Perception" p 190, Seishin Shobo, Ltd.), a light beam that has entered an eyeball EB reaches a retina 1 through a cornea 5, a pupil 4, a lens 6, and a vitreous body 7.

Human vision is generated by a visual cell of the retina 1 converting light which has been applied on the retina 1 into an electric signal and transmitting the electric signal to the visual cortex of the brain via an optic nerve 8.

As illustrated in FIG. 2, the retina 1 is present in the eyeball EB in an entire region (substantially in a shape of a spherical shell, and more detail in a state in which a portion of the spherical shell is missing) from the fundus of the eye to the ciliary body adjacent to the periphery of the lens (a position adjacent to the ciliary body illustrated in the cross section of the eyeball). However, a region in which the ambient light is applied on the retina 1 through the pupil 4 is limited due to, for example, the face or the head, and only light beams from a certain region reaches the retina 1 through the pupil 4 as an image. A certain region in which the light beams of the ambient light reach the retina 1 through the pupil 4 is a normal visual field region (hereinafter also referred to as "normal visual field region"). Hereinafter, the region in the retina 1 irradiated with the ambient light through the pupil 4 is also referred to as "ambient light irradiation region". In other words, the ambient light irradiation region is a region in the retina 1 that corresponds to the normal visual field region.

For example, as illustrated in FIGS. 3A and 3B, the visual field is limited due to irregularities formed by the frontal bone on an upper side, the upper jawbone and the zygomatic bone on a lower side, and the nasal bone on a horizontally inner side, when viewed from the eyeball. Among such a visual field, only the visual field on a horizontally outer side is not limited by the skeleton, which makes it possible to obtain the largest visual field.

Conversely, the light beam outside the normal visual field region in the ambient light does not reach the retina as an image. At a position in the retina where the light beam does not reach, a visual cell is not stimulated by light, the visual cell is not activated, and the visual information is not transmitted to the optic nerve (i.e., it is not possible to obtain vision).

As described above, although the visual cells are widely present on the retina in the eyeball, there is a first issue that it is not possible to obtain vision in a region in which the light does not reach due to the face, the head, or the like (an area outside the ambient light irradiation region).

Here, it has been reported that when the visual cortex of the brain is stimulated with TMS (transcranial magnetic stimulation), light is visible in the chest and the neck outside the normal visual field region (reference: Clinical Neurophysiology Vol. 40, No. 4, "Single-pulse stimulation" by Hideyuki Matsumoto).

This suggests that, if light can be applied in some way on a region of the retina which is a visual area of the brain but is not normally reached by light, an electric signal is generated in the visual cell in the region and is processed as an image in the visual area. In other words, it is suggested that application of light on the region makes it possible to obtain vision.

A structure of the eyeball is generally rotationally symmetric (see FIG. 2) except for distribution of visual cells on the retina (differs between a nose side and an ear side). Thus, it is considered that the visual sense is obtainable equally in the up, down, left, and right directions if there are no restrictions attributed to the shapes of the face and the head, or also in the region which is other than the region corresponding to the normal visual field region in the retina 1 and in which the visual cells are present.

That is, if it is possible to apply the light on the region in the retina where the light does not reach (the area outside the ambient light irradiation region), it is considered that the vision is obtainable from the visual cells in that region, and that it is possible to display information in a region larger than the normal visual field region and to cause the information to be visually recognized.

Further, second, there is a second issue that the visual field region becomes smaller than the normal visual field region in a case where light reaching the retina is blocked by the skin or equipment covering the eyeball for some reason, such as injury or illness.

The display device according to the present technology has been developed to address the first and second issues described above.

3. <Ambient Light Irradiation Region>

In considering the ambient light irradiation region, the ambient light irradiation region may be divided between a region in the vertical direction of the retina (a region in a vertical cross section) and a region in the horizontal direction of the retina (a region in a horizontal cross section).

(Ambient Light Irradiation Region in Vertical Direction)

FIG. 4 is a diagram for explaining an ambient light irradiation region 10V in the vertical direction (in the vertical cross section) in the retina 1.

Here, the ambient light irradiation region in one vertical cross section (for example, a vertical cross section through the center of the pupil) of the retina of the left eye is taken as an example; however, a similar discussion holds for the ambient light irradiation region in another vertical cross section of the retina of the left eye and the ambient light irradiation region in any cross section of the retina of the right eye. It is to be noted that the ambient light irradiation regions in the vertical direction of the retina of both eyes may be considered to be substantially the same. As illustrated in FIG. 4, the ambient light irradiation region 10V in the vertical direction in the retina 1 of the left eye is a substantially C-shaped region in the vertical cross section having a cut on a pupil 4 side. Similarly, the ambient light irradiation region in the vertical direction of the right eye is also a substantially C-shaped region in the vertical cross section having a cut on the pupil side.

As illustrated in FIG. 4, a position on the retina 1 at which ambient light AL, which has entered the left eye from the upper visual field limit, i.e., a direction having an angle of $\theta 1$ (e.g., 45° to 50°) upward with respect to a direction perpendicular to a radial direction (e.g., a lateral direction) of the pupil 4, and has passed through the pupil 4, reaches is a lower end 10Va of the ambient light irradiation region 10V in the vertical direction in the retina 1 of the left eye. A position on the retina 1 at which the ambient light AL, which has entered the left eye from the lower visual field limit (i.e., a direction having an angle of $\theta 2$ (e.g., 60° to 65°) downward with respect to the direction perpendicular to the radial direction (e.g., a lateral direction) of the pupil 4) and has passed through the pupil 4, reaches is an upper end 10Vb of the ambient light irradiation region 10V in the vertical direction in the retina 1 of the left eye.

(Ambient Light Irradiation Region in Horizontal Direction)

FIG. 5 is a diagram for explaining an ambient light irradiation region 10H in the horizontal direction in the retina.

Here, the ambient light irradiation region in one horizontal cross section (for example, a horizontal cross section through the center of the pupil) of the retina of the left eye is taken as an example; however, a similar discussion holds for the ambient light irradiation region in another horizontal cross section of the retina of the left eye.

As illustrated in FIG. 5, the ambient light irradiation region 10H in the horizontal direction in the retina 1 of the left eye is a substantially C-shaped region in the horizontal cross section having a cut on the pupil 4 side. Similarly, the ambient light irradiation region on the retina in the horizontal direction of the right eye is also a substantially C-shaped region in the horizontal cross section having a cut on the pupil side.

As illustrated in FIG. 5, a position on the retina 1 at which the ambient light AL, which has entered the left eye from the left visual field limit of the left eye (i.e., a direction having an angle of θ4 (e.g., 90° to 95°) leftward with respect to the direction perpendicular to the radial direction of the pupil 4, and has passed through the pupil 4, reaches is a right end 10Ha of the ambient light irradiation region 10H in the horizontal direction in the retina 1 of the left eye. A position on the retina 1 at which the ambient light AL, which has entered the left eye from the left visual field limit (i.e., a direction having an angle of θ3 (e.g., 50° to 60°) rightward with respect to the direction perpendicular to the radial direction of the pupil 4, and has passed through the pupil 4, reaches is a left end 10Hb of the ambient light irradiation region 10H in the horizontal direction in the retina 1 of the left eye.

Similarly, a position on the retina at which the ambient light AL, which has entered the eyeball of the right eye from the right visual field limit of the right eye (i.e., a direction having an angle of, for example, 90° to 95° rightward with respect to the direction perpendicular to the radial direction of the pupil) and has passed through the pupil, reaches is a left end of the ambient light irradiation region in the horizontal direction in the retina of the right eye. A position on the retina at which the ambient light AL, which has entered the right eye from the right visual field limit of the right eye (i.e., a direction having an angle of, for example, 50° to 60° leftward with respect to the direction perpendicular to the radial direction of the pupil) and has passed through the pupil, reaches is a right end of the ambient light irradiation region in the horizontal direction in the retina of the right eye.

FIG. 6 illustrates the normal visual field regions corresponding to the respective ambient light irradiation regions of both eyes. In FIG. 6, the normal visual field region of the right eye is indicated by a solid line, and the normal visual field region of the left eye is indicated by a dashed line.

4. <Display Device and Display System Including Display Device According to First Embodiment of the Present Technology>

(Overall Configuration of Display Device)

Referring to FIGS. 7, 8, 9, 10, 11, 12, 13, 14, 15, 16, 17, 18, 19A, 19B, 20, 21, 22, 23, 24, and 25, a display device 100 according to a first embodiment of the present technology will be described below.

FIG. 7 is a vertical cross-sectional view of a state in which light is applied on the retina from a display element mounted on the eyeball in a display device according to the first embodiment of the present technology. FIG. 8 is a horizontal cross-sectional view of the state in which the light is applied on the retina from the display element mounted on the eyeball in the display device according to the first embodiment of the present technology.

As illustrated in FIGS. 7 and 8, the display device 50 according to the first embodiment applies the light (e.g., display light) on the retina 1 through the pupil 4 of the eyeball EB, and displays an image (a virtual image) of the light.

The display device 50 includes a light irradiation system 100 that is able to irradiate the retina 1 with light (e.g., image light) via the pupil 4.

The light irradiation system 100 includes, as an example, a display element 100a that is to be integrated with the eyeball at least while in use. FIGS. 7 and 8 illustrate, as an example, a state in which the display element 100a is mounted on the left eye.

The display element 100a is, for example, a contact lens type display element. That is, the display element 100a is used by being mounted on the eyeball EB in such a manner as to cover the cornea 5.

The display element 100a has a transmitting section that transmits at least a portion of light having a specific wavelength (e.g., visible light) and a light-shielding section that shields the light. As a result, the ambient light AL transmits the display element 100a in a state in which the display element 100a is mounted on the eyeball EB of a user, the user is able to visually recognize a real scene through the display element 100a.

The display element 100a is, as an example, a self-luminous display element, but may include a liquid crystal display and a light source for irradiating the liquid crystal display with light.

In more detail, the display element 100a is a display element having an on-chip structure, for example.

FIGS. 9 and 10 respectively illustrate configuration examples 1 and 2 (100a-1 and 100a-2) of the display element 100a having the on-chip structure.

Configuration Example 1 of Display Element

As illustrated in FIG. 9, a display element 100a-1 includes: a first base 110 and a second base 120 disposed opposed to each other; a pixel array 130 including a plurality of pixels 130a arranged two-dimensionally on a second base 120 side surface of the first base 110; and an optical element 140-1 disposed between each of the plurality of pixels 130a and the second base 120.

The first base 110 and the second base 120 each include a member (e.g., a transparent or translucent lens material) that is transmits at least a portion of ambient light, and have a function to retain and protect the pixel array 130 and the plurality of optical elements 140-1.

Each pixel 130a of the pixel array 130 includes a light emitting element such as, for example, an organic light emitting diode (OLED), an LED (light emitting diode), or VCSEL (surface emitting laser).

The pixel array may be referred to as light emitting element array.

In the pixel array 130, for example, the pixel 130a is driven (lit) on the basis of image information, and outputs display light DL for displaying an image corresponding to the image information.

As illustrated in FIG. 9, the optical element 140-1 of the display element 100a-1 is, for example, a collimator lens that converts light outputted from a corresponding pixel 130a into substantially collimated light. In FIG. 9, a ball-type lens is used as the collimator lens; however, the collimator lens is not limited thereto, and may be a lens of other shapes, for example, a biconvex lens, a plano-convex lens, an aspherical lens, and the like.

While in use, the display element 100a-1 is mounted in such a manner that the second base 120 is in close contact with (is curved along) the cornea 5 of the eyeball EB.

In more detail, the display element 100a-1 is disposed, for example, in such a manner that the pixel 130a of the approximate center of the pixel array 130 is directly opposed to the pupil 4 (for example, in such a manner as to output light in a direction perpendicular to the radial direction of the pupil 4 to an approximate center of the pupil 4).

In the display element 100a-1 configured as described above, if at least one pixel 130a of the pixel array 130 is driven (lit) while being mounted on the eyeball EB, light is outputted from the pixel 130a. The light outputted from the pixel 130a is converted into the substantially collimated light by the optical element 140-1 and applied on the eyeball EB through the second base 120.

Configuration Example 2 of Display Element

As illustrated in FIG. 10, a display element 100a-2 differs from the display element 100a-1 in that an optical element 140-2 is disposed between the first base 110 and the second base 120, and except for that, the display element 100a-2 has a configuration and a function similar to those of the display element 100a-1. The optical element 140-2 is, for example, a gradient index lens.

The display element 100a (100a-1, 100a-2) is able to apply display light on, for example, an entire region of the retina 1 including an ambient light irradiation region 10 and a region 20 on a pupil side (a region outside the ambient light irradiation region 10, hereinafter also referred to as "pupil-side region" or "pupil-side region 20").

In detail, the display element 100a is able to apply light on at least a region outside the ambient light irradiation region 10, within a region which includes the ambient light irradiation region 10 in the retina 1 (e.g., the ambient light irradiation region 10V in the vertical direction and the ambient light irradiation region 10H of the horizontal direction) and is larger than the ambient light irradiation region 10.

Specifically, the plurality of pixels 130a of the pixel array 130 of the display element 100a is arranged two-dimensionally or three-dimensionally in such a manner as to correspond to the region larger than the ambient light irradiation region 10 in the retina 1 (in such a manner to be able to irradiate substantially the entire area of the region when all the pixels are driven). Here, "arranged three-dimensionally" is assumed to be, for example, the display element 100a is arranged two-dimensionally (arranged in a planar manner) when not in use, but is curved and substantially arranged three-dimensionally when in use (when mounted on the eyeball) (the same applies hereinafter).

The display element 100a is able to apply light on the ambient light irradiation region 10 by driving at least one pixel 130a corresponding to the ambient light irradiation region 10.

The display element 100a is able to apply light on a region outside the ambient light irradiation region 10 by driving at least one pixel 130a corresponding to the region outside the ambient light irradiation region 10.

The display element 100a is able to apply light on the ambient light irradiation region 10 and the region outside the ambient light irradiation region 10 by driving at least one pixel 130a corresponding to the ambient light irradiation region 10 and at least one pixel 130a corresponding to the region outside the ambient light irradiation region 10.

More specifically, the plurality of pixels 130a of the pixel array 130 of the display element 100a (100a-1, 100a-2) is arranged two-dimensionally or three-dimensionally in such a manner as to correspond to the ambient light irradiation region 10 and the pupil-side region 20 in the retina 1 (in such a manner as to be able to apply light on substantially the entire area of the region across the ambient light irradiation region 10 and the pupil-side region 20 when all the pixels are driven).

The display element 100a is able to apply light on the ambient light irradiation region by driving at least one pixel 130a corresponding to the ambient light irradiation region 10.

The display element 100a is able to apply light on the pupil-side region 20 by driving at least one pixel 130a corresponding to the pupil-side region 20.

The display element 100a is able to apply light on the region across the ambient light irradiation region 10 and the pupil-side region 20 by driving at least one pixel 130a corresponding to the region across the ambient light irradiation region 10 and the pupil-side region 20.

The ambient light irradiation region 10 is a region irradiated with the ambient light AL through the pupil 4 in the retina 1, as described above.

The ambient light irradiation region 10 may be determined by: parts (e.g., the nose, the eyelid, eyelashes, the outer corner of the eye, etc.) of the face around the retina 1 that prevents the ambient light AL from reaching the retina 1; and/or an object mounted on the face or the head.

Examples of the above-described object include glasses, a helmet, a mask covering the mouth or the nose, and a bandage wound on the face or the head.

The light irradiation system 100 is able to apply light on either the region 20 on the pupil side as seen from the ambient light irradiation region 10 in the retina 1 of each eye, or the region across the ambient light irradiation region 10 and the pupil-side region 20, for example. It is to be noted that the light irradiation system 100 may be able to apply light selectively on any one of the ambient light irradiation region 10, the pupil-side region 20, and the region across the ambient light irradiation region 10 and the pupil-side region 20. As a result, it is possible to display information in a desired region as necessary.

The pupil-side region 20 is at least a portion of a region adjacent to the pupil 4 side of the ambient light irradiation region 10 in the retina 1.

It is also possible to separately consider the pupil-side region 20 of each eye: a pupil-side region (a region in the vertical cross section) 20V in the vertical direction of the retina 1; and a pupil-side region (a region in the horizontal cross section) 20H in the horizontal direction of the retina 1.

Further, the pupil-side region 20V in the vertical direction of the retina 1 of the left eye includes, as illustrated in FIG. 7, a lower pupil-side region 20V-1 and an upper pupil-side region 20V-2.

Similarly, the pupil-side region in the vertical direction of the retina of the right eye also includes a lower pupil-side region and an upper pupil-side region.

Similarly, the pupil-side region 20H in the horizontal direction of the retina 1 of the left eye includes, as illustrated in FIG. 8, a left pupil-side region 20H-1 and a right pupil-side region 20H-2.

Similarly, the pupil-side region in the horizontal direction of the retina of the right eye also includes a right pupil-side region and a left pupil-side region.

(Pupil-Side Region in Vertical Direction)

As illustrated in FIG. 7, the lower pupil-side region 20V-1 in the vertical direction of the retina 1 is a certain region that forms an arc in a lower half portion of the vertical cross section (the cross section in a left-right direction) of the retina 1.

A front end 20V-1a of the lower pupil-side region 20V-1 is a position adjacent to a ciliary body in the retina 1.

A back end 20V-1b of the lower pupil-side region 20V-1 is a position adjacent to the lower end 10Va of the ambient light irradiation region 10V in the vertical direction of the retina 1.

In FIG. 7, for example, display light DL0 outputted from a pixel at a substantially middle position of the display element 100a passes through the pupil 4 and is applied on the ambient light irradiation region 10.

In FIG. 7, for example, display light DL1 outputted from a pixel at an uppermost position of the display element 100a passes through the pupil 4 and enters the front end 20V-1a of the lower pupil-side region 20V-1.

In FIG. 7, for example, display light DL2 outputted from a first pixel at a position between the pixel at the uppermost position of the display element 100a and the pixel at the substantially middle position of the display element 100a passes through the pupil 4 and enters the back end 20V-1b of the lower pupil-side region 20V-1.

In FIG. 7, for example, display light outputted from any pixel between the pixel at the uppermost position of the display element 100a and the first pixel passes through the pupil 4 and enters the lower pupil-side region 20V-1.

In FIG. 7, for example, display light outputted from any pixel between the pixel at the substantially middle position of the display element 100a and the first pixel passes through the pupil 4 and is applied on the ambient light irradiation region 10.

As illustrated in FIG. 7, the upper pupil-side region 20V-2 in the vertical direction of the retina 1 is a certain region that forms an arc in an upper half portion of the vertical cross section (the cross section in the left-right direction) of the retina 1.

A front end 20V-2a of the upper pupil-side region 20V-2 is a position adjacent to another ciliary body in the retina 1.

A back end 20V-2b of the upper pupil-side region 20V-2 is a position adjacent to the upper end 10Vb of the ambient light irradiation region 10V in the vertical direction of the retina 1.

In FIG. 7, for example, the display light DL0 outputted from the pixel at the substantially middle position of the display element 100a passes through the pupil 4 and is applied on the ambient light irradiation region 10.

In FIG. 7, for example, display light DL3 outputted from a pixel at a lowermost position of the display element 100a passes through the pupil 4 and enters the front end 20V-2a of the upper pupil-side region 20V-2.

In FIG. 7, for example, display light DL4 outputted from a second pixel at a position between the pixel at the lowermost position of the display element 100a and the pixel at the substantially middle position of the display element 100a passes through the pupil 4 and enters the back end 20V-2b of the upper pupil-side region 20V-2.

In FIG. 7, for example, display light outputted from any pixel between the pixel at the lowermost position of the display element 100a and the second pixel passes through the pupil 4 and enters the upper pupil-side region 20V-2.

In FIG. 7, for example, display light outputted from any pixel between the pixel at the substantially middle position of the display element 100a and the second pixel passes through the pupil 4 and is applied on the ambient light irradiation region 10.

As is apparent from FIG. 7, for example, the plurality of display light beams including the display light DL0, the display light DL1, the display light DL2, the display light DL3, and the display light DL4 are outputted in such a manner as to intersect with each other in the vicinity of the pupil 4. As a result, it is possible to apply the display light on substantially the entire area of the retina 1 through the pupil 4. That is, it is possible to prevent each display light from being kicked (shielded) by the peripheral portion (for example, the iris) of the pupil 4.

(Pupil-Side Region in Horizontal Direction)

As illustrated in FIG. 8, the left pupil-side region 20H-1 in the horizontal direction of the retina 1 is a certain region that forms an arc in a left half portion of the horizontal cross section (the cross section in an up-down direction) of the retina 1.

A front end 20H-1a of the left pupil-side region 20H-1 of the left eye is a position adjacent to a ciliary body in the retina 1 of the left eye.

A back end 20H-1b of the left pupil-side region 20H-1 of the left eye is a position adjacent to the left end 10Hb of the ambient light irradiation region 10H in the horizontal direction of the retina 1 of the left eye.

In FIG. 8, for example, display light DL0 outputted from a pixel at a substantially middle position of the display element 100a passes through the pupil 4 and is applied on the ambient light irradiation region 10.

In FIG. 8, for example, display light DL5 outputted from a pixel at a rightmost position of the display element 100a passes through the pupil 4 and enters the front end 20H-1a of the left pupil-side region 20H-1.

In FIG. 8, for example, display light DL6 outputted from a third pixel at a position between the pixel at the rightmost position of the display element 100a and the pixel at the substantially middle position of the display element 100a passes through the pupil 4 and enters the back end 20H-1b of the left pupil-side region 20H-1.

In FIG. 8, for example, display light outputted from any pixel between the pixel at the rightmost position of the display element 100a and the third pixel passes through the pupil 4 and enters the left pupil-side region 20H-1.

In FIG. 8, for example, display light outputted from any pixel between the pixel at the substantially middle position of the display element 100a and the third pixel passes through the pupil 4 and is applied on the ambient light irradiation region 10.

As illustrated in FIG. 8, the right pupil-side region 20H-2 in the horizontal direction of the retina 1 of the left eye is a certain region that forms an arc in a right half portion of the horizontal cross section (the cross section in the up-down direction) of the retina 1.

A front end 20H-2a of the right pupil-side region 20H-2 of the left eye is a position adjacent to another ciliary body in the retina 1 of the left eye.

A back end 20H-2b of the right pupil-side region 20H-2 of the left eye is a position adjacent to the right end 10Ha of the ambient light irradiation region 10H in the horizontal direction of the retina 1 of the left eye.

In FIG. 8, for example, the display light DL0 outputted from the pixel at the substantially middle position of the display element 100a passes through the pupil 4 and is applied on the ambient light irradiation region 10.

In FIG. 8, for example, display light DL7 outputted from a pixel at a leftmost position of the display element 100a passes through the pupil 4 and enters the front end 20H-2a of the right pupil-side region 20H-2.

In FIG. 8, for example, display light DL8 outputted from a fourth pixel at a position between the pixel at the leftmost position of the display element 100a and the pixel at the substantially middle position of the display element 100a passes through the pupil 4 and enters the back end 20H-2b of the right pupil-side region 20H-2.

In FIG. 8, for example, display light outputted from any pixel between the pixel at the leftmost position of the display element 100a and the fourth pixel passes through the pupil 4 and enters the right pupil-side region 20H-2.

In FIG. 8, for example, display light outputted from any pixel between the pixel at the substantially middle position of the display element 100a and the fourth pixel passes through the pupil 4 and is applied on the ambient light irradiation region 10.

In FIG. 8, for example, the plurality of display light beams including the display light DL0, the display light DL5, the display light DL6, the display light DL7, and the display light DL8 are outputted in such a manner as to intersect with each other in the vicinity of the pupil 4. As a result, it is possible to apply all the display light beams on the retina 1 through the pupil 4. That is, it is possible to prevent each display light from being kicked (shielded) by the peripheral portion (for example, the iris) of the pupil 4.

(Pixel Arrangement Example of Display Element)

Hereinafter, referring to FIGS. 11 to 17, pixel arrangement examples (examples of pixel arrays) of the display element 100a will be described.

As described above, the display element 100a has the transmitting section (e.g., a transparent section or a translucent section) that transmits at least a portion of light having a specific wavelength (e.g., visible light) and the light-shielding section that shields the light.

In a pixel array 130-1 illustrated in FIG. 11, the plurality of pixels 130a to be the transmitting section are arranged two-dimensionally or three-dimensionally in a matrix without any gap.

In a pixel array 130-2 illustrated in FIG. 12, the plurality of pixels 130a to be the light-shielding section are arranged two-dimensionally or three-dimensionally in a matrix, for example, via gaps 130b to be the transmitting section.

It is to be noted that, in the pixel array 130-2, the plurality of pixels 130a to be the transmitting section may be arranged two-dimensionally or three-dimensionally via the gaps 130b to be the light-shielding section.

In a pixel array 130-3 illustrated in FIG. 13, the plurality of pixels 130a to be the light-shielding section is arranged two-dimensionally or three-dimensionally in a matrix, for example, via the gaps 130b to be the transmitting section, and the pixels 130a adjacent to each other are coupled by a wiring line 130c to be the light-shielding section. The wiring line 130c is a wiring line for supplying a current to the pixel 130a.

It is to be noted that the configuration of the transmitting section and the light-shielding section of the pixel array 130-3 is not limited to the above-described configuration, and at least one of the pixel 130a, the gap 130b, or the wiring line 130c may be the transmitting section.

For example, the wiring line 130c disposed between the pixels 130a may be the transmitting section In a pixel array 130-4 illustrated in FIG. 14, the pixel 130a to be the light-shielding section is disposed via the gap 130b to be the transmitting section in each cell (a space portion) partitioned by a plurality of lattice wiring lines 130d to be the light-shielding section arranged in a two-dimensional lattice shape. That is, the transmitting section is the gaps between the pixels 130a. For example, an L-shaped bent wiring line 130e that couples mutually perpendicular lattice wiring lines 130d passes through the pixel 130a. The bent wiring line 130e is a wiring line for supplying a current to the pixel 130a.

It is to be noted that the configuration of the transmitting section and the light-shielding section of the pixel array 130-4 is not limited to the above-described configuration, and at least one of the pixel 130a, the gap 130b, the lattice wiring line 130d, or the bent wiring line 130e may be the transmitting section. For example, the gap 130b between the pixels 130a may be the light-shielding section.

In a pixel array 130-5 illustrated in FIG. 15, the plurality of pixel 130a to be the light-shielding section and the plurality of gaps 130b to be a translucent section are disposed in a staggered arrangement as a whole.

In the pixel array 130-5, the plurality of pixels 130a to be the translucent portion and the plurality of gaps 130b to be the light-shielding section may be disposed in a staggered arrangement as a whole.

In a pixel array 130-6 illustrated in FIG. 16, the plurality of (e.g., two) pixels 130a to be the light-shielding section and the plurality of (e.g., two) gaps 130b are disposed in a staggered arrangement as a whole, in each cell (a space portion) partitioned by a plurality of lattice wiring lines 130f to be the light-shielding section arranged in a two-dimensional lattice shape.

It is to be noted that, in the pixel array 130-6, the plurality of (e.g., two) pixels 130a to be the transmitting section and the plurality of (e.g., two) gaps to be the light-shielding section may be disposed in a staggered arrangement in each cell described above.

That is, the lattice wiring line 130f between pixel groups each including at least two (e.g., two) pixels 130a may be the transmitting section.

In a pixel array 130-7 illustrated in FIG. 17, the plurality of pixels 130a to be the light-shielding section and the plurality of gaps 130b to be the translucent section are disposed in a staggered arrangement as a whole. In each gap 130b, a horizontal wiring line 130g and a vertical wiring line 130h are disposed. The horizontal wiring line 130g couples to each other the pixels 130a that are adjacent to each other in the horizontal direction, and the vertical wiring line 130h couples to each other the pixels 130a that are adjacent to each other in the vertical direction.

(Display System)

Hereinafter, referring to FIG. 18, a display system 1000 including the display device 50 according to the first embodiment of the present technology will be described.

FIG. 18 is a block diagram illustrating a function of the display system 1000.

The display system 1000 includes, in addition to the display device 50, a control device 170.

The control device 170 includes, for example, a signal input section 1000a, a signal processor 1000b, a driver 1000c, a display element 100a, an electric power acquisition section 1000d, and a power source 1000e.

The signal input section 1000a enters an image signal from an external device (e.g., a sensor).

The signal processor 1000b processes the image signal entered via the signal input section 1000a and generates a drive signal (a modulation signal) for driving the display element 100a. The driver 1000c applies the drive signal received from the signal processor 1000b to display element 100a and drives the display element 100a.

The electric power acquisition section 1000*d* acquires electric power from the power source 1000*e* via wire or radio, and distributes the electric power to the signal input section 1000*a*, the signal processor 1000*b*, the driver 1000*c*, and the display element 100*a*.

The power source 1000*e* may be a storage battery (e.g., a battery, a secondary battery, etc.) or may be a source of generating electric power.

It is preferable that the display device 50 include, as the external device, a sensor 1500 (e.g., an image sensor) that detects outside-of-normal-visual-field-region information which is information outside the normal visual field region corresponding to the ambient light irradiation region 10, and display the outside-of-normal-visual-field-region information detected by the sensor 1500 on a visual field region corresponding to an area which includes the ambient light irradiation region 10 and is larger than the ambient light irradiation region 10.

The display device 50 according to the first embodiment described above includes the light irradiation system 100. The light irradiation system 100 is able to apply light on at least a region outside the ambient light irradiation region 10, within a region which includes the ambient light irradiation region 10 and is larger than the ambient light irradiation region 10. The ambient light irradiation region 10 is the region in the retina 1 on which the ambient light AL is to be applied through the pupil 4.

This enables an image of light (a virtual image) to be displayed also in the region corresponding to the region outside the ambient light irradiation region 10, within the region which includes the ambient light irradiation region 10 corresponding to the normal visual field region and is larger than the ambient light irradiation region 10.

As a result, the display device 50 makes it possible to display information and cause the information to be visually recognized in the region larger than the visual field region (the normal visual field region) (hereinafter also referred to as "expanded visual field region").

In considering the expanded visual field region, the expanded visual field region may be divided between an expanded visual field region in the vertical direction and an expanded visual field region in the horizontal direction.

The expanded visual field region in the vertical direction includes, for example, as illustrated in FIG. 19A: an upper expanded visual field region that is a region having an angle θ1 greater than the normal visual field region in the vertical direction and the upward direction (e.g., a region of 45° to 50° upward in the lateral direction); and a lower expanded visual field region that is a region having an angle θ2 greater than the normal visual field region in the vertical direction and the downward direction (e.g., a region of 60° to 65° downward in the lateral direction). The expanded visual field region in the leftward direction is, for example, as illustrated in FIG. 19B, a region having an angle θ3 greater than the normal visual field region in the leftward direction (a region of 50° to 60° from the front to the left).

The expanded visual field region in the rightward direction is, for example, as illustrated in FIG. 19B, a region having an angle θ4 greater than the normal visual field region in the rightward direction (a region of 50° to 60° from the front to the right).

FIG. 20 is a diagram illustrating an expanded visual field region of the right eye. In FIG. 20, an outermost circle is a maximum visual field region (hereinafter also referred to as "virtual maximum visual field region") of each eye in a case of assuming that the visual field is not limited at all due to the face, the head, and/or an object mounted on the face or the head. A right-downward direction in FIG. 20 has a largest visual field, and the maximum visual field is expanded with respect to all directions on the basis of this maximum viewing angle.

As indicated by the arrows in FIG. 20, application of the display light on the ambient light irradiation region 10 and/or at least a portion of the pupil-side region 20 from the display device of the present technology makes it possible to display information (a virtual image) on the normal visual field region and/or a region from the normal visual field region to the virtual maximum visual field region.

FIG. 21 illustrates the region from the normal visual field region to the virtual maximum visual field region in a grid pattern. In the following, the expanded visual field region that particularly matches the virtual maximum visual field region is also referred to as "maximum expanded visual field region".

People have different facial shapes; thus, skull shapes are also different. Therefore, regions of the ambient light irradiation blocked by the respective faces are also different from each other. There are also individual differences in an amount of protrusion of the eyeball relative to the skull. Individual differences are also considered to exist in a positional relation between the ciliary body and the retina in the eyeball. Accordingly, it is reasonable to consider that the retina exists in a region larger than the maximum viewing angle of the right eye illustrated in FIG. 20.

FIG. 22 illustrates the maximum expanded visual field region when the display light is applied on the region larger than the virtual maximum visual field region of FIG. 20, thereby enabling a large display exceeding the maximum viewing angle of the user.

As indicated by arrows in FIG. 22, application of the display light on the ambient light irradiation region 10 and/or at least a portion of the pupil-side region 20 from the display device of the present technology makes it possible to display information (a virtual image) on the normal visual field region and/or a region from the normal visual field region to the expanded virtual maximum visual field region.

FIG. 23 is a diagram illustrating a state in which the visual field regions of both eyes are expanded to the virtual maximum visual field region, i.e., a state in which the expanded visual field regions of both eyes matches the virtual maximum visual field region.

In FIG. 23, the maximum expanded visual field region (the maximum virtual visual field region) of the right eye is indicated by a solid line and the maximum expanded visual field region (the maximum virtual visual field region) of the left eye is indicated by a dashed line.

Incidentally, a region that is ordinarily viewed serves as a perceived visual field; thus, it is usually not perceived that the visual field is small. For example, although the visual field on an inner side of the left eye is 30° to 40° smaller than the visual field on an outer side, the visual field is not perceived to be small. A reason for this is that visual field information obtained by the right eye is interpolated in the brain.

For example, if a display element is mounted only on the left eye and an image is displayed on a left outer side (a region on a side opposite to a right eye side) on the retina of the left eye, visual field information of both eyes is interpolated in the brain, and it is possible to cause the image to be recognized as if the image is displayed on a right-side peripheral visual field of the right eye (a peripheral portion of the visual field region).

Incidentally, it is known that binocular rivalry occurs when images different from each other are provided on the left and right retinas. However, light beams applied on the peripheral portion on the left outer side on the retina of the left eye are limited due to the shape of the face, and the ambient light is not originally applied on the peripheral portion. Accordingly, there is no information of the image; thus, an influence of the binocular rivalry caused by displaying the image only on the left eye is small.

There may be a case where a person having visual field constriction is in a state of not being able to see a portion of the peripheral visual field, but may live without being aware of his/her symptom. The symptom gradually progresses while a central vision is maintained. Accordingly, the person is often unaware of the symptom.

In a case where the visual field constriction occurs in one eye and a portion of the visual field of the one eye is not visible, it is possible to compensate the visual field of the one eye which is lost due to the visual field constriction by applying light, from the light irradiation system 100, on a region in the retina of the other eye where the visual field constriction does not occur, the region corresponding to the visual field region of the one eye whose visual field is lost due to the visual field constriction.

FIG. 24 is a diagram illustrating a case where the left eye has visual field constriction and a state in which the visual field region of the left eye indicated by a short-dashed line is smaller than the normal visual field region indicated by a long-dashed line.

FIG. 25 is a diagram illustrating a state in which the visual field region of the right eye is expanded from the state of FIG. 24.

As illustrated in FIG. 25, light is applied, from the light irradiation system 100, on at least a portion of the ambient light irradiation region 10 and the pupil-side region 20 in a region on the left side (a region on the side of the left eye) in the retina of the right eye, thereby making it possible to greatly expand the visual field region of the right eye to be larger than the normal visual field region, and in addition, making it possible to greatly expand the visual field region of left eye to be substantially larger than the normal visual field region.

Conversely, in a case where the right eye has visual field constriction, light is applied, from the light irradiation system 100, on at least a portion of the ambient light irradiation region 10 and the pupil-side region 20 in a region on the right side (a region on the side of the right eye) in the retina of the left eye, thereby making it possible to greatly expand the visual field region of the left eye to be larger than the normal visual field region, and in addition, making it possible to greatly expand the visual field region of right eye to be substantially larger than the normal visual field region.

The light irradiation system 100 is able to selectively apply light on: the ambient light irradiation region 10, the region 20 on the pupil side of the ambient light irradiation region 10 in the retina 1; or the region across the ambient light irradiation region 10 and the region 20 on the pupil side.

5. <Display Device and Display System Including Display Device According to Second Embodiment of the Present Technology>

Referring to FIGS. 26 to 28, a display device 150 according to a second embodiment of the present technology will be described below.

As illustrated in FIGS. 26 and 27, in the display device 150 according to the second embodiment, a light irradiation system 200 includes: an optical element 200a that is to be integrated with the eyeball at least while in use; and a light projector 200b that projects light toward the optical element 200a.

The optical element 200a is, for example, a contact lens type optical element (e.g., a lens), having a function of bending an entering light beam by refraction or diffraction, and is mounted on the eyeball EB in such a manner as to cover the cornea 5. FIGS. 26 and 27 each illustrates an example in which the optical element 200a is mounted on the left eye.

The light projector 200b includes, for example, a light source and a collimator lens that converts light from the light source into collimated light.

In FIG. 26, for example, a projection light beam PL0 projected from the light projector 200b and entered a middle position of the optical element 200a passes through the optical element 200a, and thereafter passes through the cornea 5 and the pupil 4, and is applied on the ambient light irradiation region 10 as the display light DL0.

In FIG. 26, for example, a projection light beam PL1 projected from the light projector 200b and entered an uppermost position of the optical element 200a is largely refracted or diffracted downward by the optical element 200a, passes through the cornea 5 and the pupil 4, and enters the front end 20V-1a of the lower pupil-side region 20V-1 as the display light DL1.

In FIG. 26, for example, a projection light beam PL2 projected from the light projector 200b and entered a first position between the uppermost position and the middle position of the optical element 200a is refracted or diffracted downward by the optical element 200a, passes through the cornea 5 and the pupil 4, and enters the back end 20V-1b of the lower pupil-side region 20V-1 as the display light DL2.

In FIG. 26, for example, a projection light beam projected from the light projector 200b and entered any position between the uppermost position and the first position of the optical element 200a is refracted or diffracted downward by the optical element 200a, passes through the cornea 5 and the pupil 4, and enters the lower pupil-side region 20V-1 as the display light.

In FIG. 26, for example, a projection light beam projected from the light projector 200b and entered any position between the first position and the middle position of the optical element 200a is refracted or diffracted downward by the optical element 200a, passes through the cornea 5 and the pupil 4, and enters the ambient light irradiation region 10 as the display light.

In FIG. 26, for example, a projection light beam PL4 projected from the light projector 200b and entered a lowermost position of the optical element 200a is largely refracted or diffracted upward by the optical element 200a, passes through the cornea 5 and the pupil 4, and enters the front end 20V-2a of the upper pupil-side region 20V-2 as the display light DL4.

In FIG. 26, for example, a projection light beam PL3 projected from the light projector 200b and entered a second position between the lowermost position and the middle position of the optical element 200a is refracted or diffracted upward by the optical element 200a, passes through the cornea 5 and the pupil 4, and enters the back end 20V-2b of the upper pupil-side region 20V-2 as the display light DL3.

In FIG. 26, for example, a projection light beam projected from the light projector 200b and entered any position between the uppermost position and the second position of the optical element 200a is refracted or diffracted upward by the optical element 200, passes through the cornea 5 and the pupil 4, and enters the upper pupil-side region 20V-2 as the display light.

In FIG. 26, for example, a projection light beam projected from the light projector 200b and entered any position between the second position and the middle position of the optical element 200a is refracted or diffracted upward by the optical element 200a, passes through the cornea 5 and the pupil 4, and enters the ambient light irradiation region 10 as the display light.

In FIG. 27, for example, the projection light beam PL0 projected from the light projector 200b and entered the middle position of the optical element 200a passes through the optical element 200a, and thereafter passes through the cornea 5 and the pupil 4, and is applied on the ambient light irradiation region 10 as the display light DL0.

In FIG. 27, for example, a projection light beam PL5 projected from the light projector 200b and entered a rightmost position of the optical element 200a is refracted or diffracted leftward by the optical element 200a, passes through the cornea 5 and the pupil 4, and enters the front end 20H-1a of the left pupil-side region 20H-1 as the display light DL5.

In FIG. 27, for example, a projection light beam PL6 projected from the light projector 200b and entered a third position between the rightmost position and the middle position of the optical element 200a is refracted or diffracted leftward by the optical element 200a, passes through the cornea 5 and the pupil 4, and enters the back end 20H-1b of the left pupil-side region 20H-1 as the display light DL6.

In FIG. 27, for example, a projection light beam projected from the light projector 200b and entered any position between the rightmost position and the third position of the optical element 200a is refracted or diffracted leftward by the optical element 200a, passes through the cornea 5 and the pupil 4, and enters the left pupil-side region 20H-1 as the display light.

In FIG. 27, for example, a projection light beam projected from the light projector 200b and entered any position between the third position and the middle position of the optical element 200a is refracted or diffracted leftward by the optical element 200a, passes through the cornea 5 and the pupil 4, and enters the ambient light irradiation region 10 as the display light.

In FIG. 27, for example, a projection light beam PL8 projected from the light projector 200b and entered a leftmost position of the optical element 200a is largely refracted or diffracted rightward by the optical element 200a, passes through the cornea 5 and the pupil 4, and enters the front end 20H-2a of the right pupil-side region 20H-2 as the display light DL8.

In FIG. 27, for example, a projection light beam PL7 projected from the light projector 200b and entered a fourth position between the leftmost position and the middle position of the optical element 200a is refracted or diffracted rightward by the optical element 200a, passes through the cornea 5 and the pupil 4, and enters the back end 20H-2b of the right pupil-side region 20H-2 as the display light DL7.

In FIG. 27, for example, a projection light beam projected from the light projector 200b and entered any position between the leftmost position and the fourth position of the optical element 200a is refracted or diffracted rightward by the optical element 200a, passes through the cornea 5 and the pupil 4, and enters the right pupil-side region 20H-2 as the display light.

In FIG. 27, for example, a projection light beam projected from the light projector 200b and entered any position between the fourth position and the middle position of the optical element 200a is refracted or diffracted rightward by the optical element 200a, passes through the cornea 5 and the pupil 4, and enters the ambient light irradiation region 10 as the display light.

FIG. 28 is a block diagram illustrating a function of a display system 2000 including the display device 150 according to the second embodiment.

As illustrated in FIG. 28, the display system 2000 has a configuration and a function similar to those of the display system 1000 including the display device 50 illustrated in FIG. 18, except that an object to be driven by the driver 1000c is the light projector 200b (in more detail, a light source of the light projector 200b).

The display device 150 according to the second embodiment described above also exhibits substantially similar effects as the display device 50 according to the first embodiment described above. The display system 2000 including the display device 150 has substantially similar effects as the display system 1000 including the display device 50.

6. <Display Device According to Third Embodiment of the Present Technology>

Referring to FIGS. 29 to 32, display devices 250 (display devices 250-1 to 250-4 of working examples 1 to 4) according to a third embodiment of the present technology will be described below. Here, the display device 250 is described using only the horizontal cross section; however, a similar discussion holds for the vertical cross section.

In the display device 250 (250-1 to 250-4) according to the third embodiment, a display element 300a (300a-1 to 300a-4) of a light irradiation system 300 (300-1 to 300-4) is embedded in the lens 6.

Display Device According to Working Example 1 of Third Embodiment

As illustrated in FIG. 29, the display element 300a-1 according to the working example 1 of the third embodiment is embedded in the middle inside the lens 6 in a substantially flat plate shape in such a manner as to be opposed to the pupil 4.

In FIG. 29, the display light DL0 outputted from a pixel at a middle position of the display element 300a-1 according to the working example 1 enters the ambient light irradiation region 10.

In FIG. 29, the display light DL1 outputted from a pixel at a rightmost position of the display element 300a-1 according to the working example 1 enters the front end 20H-2a of the right pupil-side region 20H-2.

In FIG. 29, the display light DL2 outputted from a pixel at a first position between the rightmost position and the middle position of the display element 300a-1 according to the working example 1 enters the back end 20H-2b of the right pupil-side region 20H-2.

In FIG. 29, the display light outputted from any pixel at a position between the rightmost position and the first position of the display element 300a-1 according to the working example 1 enters the right pupil-side region 20H-2.

In FIG. 29, the display light outputted from any pixel at a position between the first position and the middle position of the display element 300a-1 according to the working example 1 enters the ambient light irradiation region 10.

In FIG. 29, the display light DL4 outputted from a pixel at a leftmost position of the display element 300a-1 according to the working example 1 enters the front end 20H-1a of the left pupil-side region 20H-1.

In FIG. 29, the display light DL3 outputted from a pixel at a second position between the leftmost position and the middle position of the display element 300a-1 according to the working example 1 enters the back end 20H-1b of the left pupil-side region 20H-1.

In FIG. 29, the display light outputted from any pixel at a position between the leftmost position and the second position of the display element 300a-1 according to the working example 1 enters the left pupil-side region 20H-1.

In FIG. 29, the display light outputted from any pixel at a position between the second position and the middle position of the display element 300a-1 according to the working example 1 enters the ambient light irradiation region 10.

Display Device According to Working Example 2 of Third Embodiment

As illustrated in FIG. 30, the display element 300a-2 according to the working example 2 of the third embodiment is embedded in the middle inside the lens 6 in a substantially flat plate shape in such a manner as to be opposed to the pupil 4.

In FIG. 30, the display light DL0 outputted from a pixel at a middle position of the display element 300a-2 according to the working example 2 enters the ambient light irradiation region 10.

In FIG. 30, the display light DL1 outputted from a pixel at a rightmost position of the display element 300a-2 according to the working example 2 enters the front end 20H-1a of the left pupil-side region 20H-1.

In FIG. 30, the display light DL2 outputted from a pixel at a first position between the rightmost position and the middle position of the display element 300a-2 according to the working example 2 enters the back end 20H-1b of the left pupil-side region 20H-1.

In FIG. 30, the display light outputted from any pixel at a position between the rightmost position and the first position of the display element 300a-2 according to the working example 2 enters the left pupil-side region 20H-1.

In FIG. 30, the display light outputted from any pixel at a position between the first position and the middle position of the display element 300a-2 according to the working example 2 enters the ambient light irradiation region 10.

In FIG. 30, the display light DL4 outputted from a pixel at a leftmost position of the display element 300a-2 according to the working example 2 enters the front end 20H-2a of the right pupil-side region 20H-2.

In FIG. 30, the display light DL3 outputted from a pixel at a second position between the leftmost position and the middle position of the display element 300a-2 according to the working example 2 enters the back end 20H-2b of the right pupil-side region 20H-2.

In FIG. 30, the display light outputted from any pixel at a position between the leftmost position and the second position of the display element 300a-2 according to the working example 2 enters the right pupil-side region 20H-2.

In FIG. 30, the display light outputted from any pixel at a position between the second position and the middle position of the display element 300a-2 according to the working example 2 enters the ambient light irradiation region 10.

As is apparent from FIG. 30, the display element 300a-2 according to the working example 2 outputs the plurality of display light beams in such a manner as to intersect with each other inside the lens 6.

Display Device According to Working Example 3 of Third Embodiment

As illustrated in FIG. 31, the display element 300a-3 according to the working example 3 of the third embodiment is embedded in an end portion of the lens 6 on the opposite side to the pupil 4 side in a curved state in such a manner as to be opposed to the pupil 4 and to be convex on the opposite side to the pupil 4 side.

In FIG. 31, the display light DL0 outputted from a pixel at a middle position of the display element 300a-3 according to the working example 3 enters the ambient light irradiation region 10.

In FIG. 31, the display light DL1 outputted from a pixel at a rightmost position of the display element 300a-3 according to the working example 3 enters the front end 20H-2a of the right pupil-side region 20H-2.

In FIG. 31, the display light DL2 outputted from a pixel at a first position between the rightmost position and the middle position of the display element 300a-3 according to the working example 3 enters the back end 20H-2b of the right pupil-side region 20H-2.

In FIG. 31, the display light outputted from any pixel at a position between the rightmost position and the first position of the display element 300a-3 according to the working example 3 enters the right pupil-side region 20H-2.

In FIG. 31, the display light outputted from any pixel at a position between the first position and the middle position of the display element 300a-3 according to the working example 3 enters the ambient light irradiation region 10.

In FIG. 31, the display light DL4 outputted from a pixel at a leftmost position of the display element 300a-3 according to the working example 3 enters the front end 20H-1a of the left pupil-side region 20H-1.

In FIG. 31, the display light DL3 outputted from a pixel at a second position between the leftmost position and the middle position of the display element 300a-3 according to the working example 3 enters the back end 20H-1b of the left pupil-side region 20H-1.

In FIG. 31, the display light outputted from any pixel at a position between the leftmost position and the second position of the display element 300a-3 according to the working example 3 enters the left pupil-side region 20H-1.

In FIG. 31, the display light outputted from any pixel at a position between the second position and the middle position of the display element 300a-3 according to the working example 3 enters the ambient light irradiation region 10.

Display Device According to Working Example 4 of Third Embodiment

As illustrated in FIG. 32, the display element 300a-4 according to the working example 4 of the third embodiment is embedded in an end portion of the lens 6 on the pupil 4 side in a curved state in such a manner as to be adjacent to the pupil 4.

In FIG. 32, the display light DL0 outputted from a pixel at a middle position of the display element 300a-4 according to the working example 4 enters the ambient light irradiation region 10.

In FIG. 32, the display light DL1 outputted from a pixel at a rightmost position of the display element 300a-4 according to the working example 4 enters the front end 20H-1a of the left pupil-side region 20H-1.

In FIG. 32, the display light DL2 outputted from a pixel at a first position between the rightmost position and the middle position of the display element 300a-4 according to the working example 4 enters the back end 20H-1b of the left pupil-side region 20H-1.

In FIG. 32, the display light outputted from any pixel at a position between the rightmost position and the first position of the display element 300a-4 according to the working example 4 enters the left pupil-side region 20H-1.

In FIG. 32, the display light outputted from any pixel at a position between the first position and the middle position of the display element 300a-4 according to the working example 4 enters the ambient light irradiation region 10.

In FIG. 32, the display light DL4 outputted from a pixel at a leftmost position of the display element 300a-4 according to the working example 4 enters the front end 20H-2a of the right pupil-side region 20H-2.

In FIG. 32, the display light DL3 outputted from a pixel at a second position between the leftmost position and the middle position of the display element 300a-4 according to the working example 4 enters the back end 20H-2b of the right pupil-side region 20H-2.

In FIG. 32, the display light outputted from any pixel at a position between the leftmost position and the second position of the display element 300a-4 according to the working example 4 enters the right pupil-side region 20H-2.

In FIG. 32, the display light outputted from any pixel at a position between the second position and the middle position of the display element 300a-4 according to the working example 4 enters the ambient light irradiation region 10.

As is apparent from FIG. 32, the display element 300a-4 according to the working example 4 outputs the plurality of display light beams in such a manner as to intersect with each other inside the lens 6.

The display device 250 according to the third embodiment described above also exhibits substantially similar effects as the display device 50 according to the first embodiment and the display device 150 according to the second embodiment described above.

7. <Display Device According to Fourth Embodiment of the Present Technology>

Referring to FIG. 33 to FIG. 38, display devices 350 (display devices 350-1 to 350-6 of working examples 1 to 6) according to a fourth embodiment of the present technology will be described below. Here, the display device 350 is described using only the horizontal cross-sectional view; however, a similar discussion holds for the vertical cross section.

In the display device 350 (350-1 to 350-6) according to the fourth embodiment, a light irradiation system 400 (400-1 to 400-6) includes: an optical element 400a (400a-1 to 400a-6); and the light projector 200b that projects light on the optical element 400a.

Display Device According to Working Example 1 of Fourth Embodiment

As illustrated in FIG. 33, the optical element 400a-1 of the display device 350-1 according to the working example 1 of the fourth embodiment is embedded in the middle inside the lens 6 in a substantially flat plate shape in such a manner as to be opposed to the pupil 4.

As an example, the optical element 400a-1 has a refractive index profile in which a refractive index increases in such a manner that entering light is refracted outward (in a direction from a central portion to a peripheral portion) as the light travels from the central portion to the peripheral portion. Further, as another example, in a case of using an optical element that diffracts the entering light beam, it is set in such a manner that a light beam that enters the peripheral portion of the optical element has a larger angle of outward diffraction as compared with a light beam that enters the center portion of the optical element.

In FIG. 33, for example, the projection light beam PL0 projected from the light projector 200b, passed through the cornea 5 and the pupil 4, and entered a middle position of the optical element 400a-1 travels straight inside the optical element 400a-1, and enters the ambient light irradiation region 10.

In FIG. 33, for example, the projection light beam PL1 projected from the light projector 200b, passed through the cornea 5 and the pupil 4, and entered a rightmost position of the optical element 400a-1 is largely refracted rightward by the optical element 400a-1, and enters the front end 20H-2a of the right pupil-side region 20H-2 as the display light DL1.

In FIG. 33, for example, the projection light beam PL2 projected from the light projector 200b, passed through the cornea 5 and the pupil 4, and entered a first position between the rightmost position and the middle position of the optical element 400a-1 is refracted rightward by the optical element 400a-1, and enters the back end 20H-2b of the right pupil-side region 20H-2 as the display light DL2.

In FIG. 33, for example, any projection light beam projected from the light projector 200b, passed through the cornea 5 and the pupil 4, and entered a position between the rightmost position and the first position of the optical element 400a-1 is refracted rightward by the optical element 400a-1, and enters the right pupil-side region 20H-2 as the display light.

In FIG. 33, for example, any projection light beam projected from the light projector 200b, passed through the cornea 5 and the pupil 4, and entered a position between the first position and the middle position of the optical element 400a-1 is refracted rightward by the optical element 400a-1, and enters the ambient light irradiation region 10 as the display light.

In FIG. 33, for example, the projection light beam PL4 projected from the light projector 200b, passed through the cornea 5 and the pupil 4, and entered a leftmost position of the optical element 400a-1 is largely refracted leftward by the optical element 400a-1, and enters the front end 20H-1a of the left pupil-side region 20H-1 as the display light DL4.

In FIG. 33, for example, the projection light beam PL3 projected from the light projector 200b, passed through the cornea 5 and the pupil 4, and entered a second position between the leftmost position and the middle position of the optical element 400a-1 is refracted leftward by the optical element 400a-1, and enters the back end 20H-1b of the left pupil-side region 20H-1 as the display light DL3.

In FIG. 33, for example, any projection light beam projected from the light projector 200b, passed through the cornea 5 and the pupil 4, and entered a position between the leftmost position and the second position of the optical element 400a-1 is refracted leftward by the optical element 400a-1, and enters the left pupil-side region 20H-1 as the display light.

In FIG. 33, for example, any projection light beam projected from the light projector 200*b*, passed through the cornea 5 and the pupil 4, and entered a position between the second position and the middle position of the optical element 400*a*-1 is refracted leftward by the optical element 400*a*-1, and enters the ambient light irradiation region 10 as the display light.

Display Device According to Working Example 2 of Fourth Embodiment

As illustrated in FIG. 34, the optical element 400*a*-2 according to the working example 2 of the fourth embodiment is embedded in the middle inside the lens 6 in a substantially flat plate shape in such a manner as to be opposed to the pupil 4.

The optical element 400*a*-2 has a refractive index profile in which a refractive index increases in such a manner that the entering light is refracted inward (in a direction from the peripheral portion to the central portion) as the light travels from the central portion to the peripheral portion. Further, as another example, in a case of using an optical element that diffracts the entering light beam, it is set in such a manner that a light beam that enters the peripheral portion of the optical element has a larger angle of inward diffraction as compared with a light beam that enters the center portion of the optical element.

In FIG. 34, for example, the projection light beam PL0 projected from the light projector 200*b*, passed through the cornea 5 and the pupil 4, and entered a middle position of the optical element 400*a*-2 travels straight inside the optical element 400*a*-2, and enters the ambient light irradiation region 10.

In FIG. 34, for example, the projection light beam PL1 projected from the light projector 200*b*, passed through the cornea 5 and the pupil 4, and entered a rightmost position of the optical element 400*a*-2 is largely refracted leftward by the optical element 400*a*-2, and enters the front end 20H-1*a* of the left pupil-side region 20H-1 as the display light DL1.

In FIG. 34, for example, the projection light beam PL2 projected from the light projector 200*b*, passed through the cornea 5 and the pupil 4, and entered a first position between the rightmost position and the middle position of the optical element 400*a*-2 is refracted leftward by the optical element 400*a*-1, and enters the back end 20H-1*b* of the left pupil-side region 20H-1 as the display light DL2.

In FIG. 34, for example, any projection light beam projected from the light projector 200*b*, passed through the cornea 5 and the pupil 4, and entered a position between the rightmost position and the first position of the optical element 400*a*-2 is refracted leftward by the optical element 400*a*-2, and enters the left pupil-side region 20H-1 as the display light.

In FIG. 34, for example, any projection light beam projected from the light projector 200*b*, passed through the cornea 5 and the pupil 4, and entered a position between the first position and the middle position of the optical element 400*a*-2 is refracted leftward by the optical element 400*a*-2, and enters the ambient light irradiation region 10 as the display light.

In FIG. 34, for example, the projection light beam PL4 projected from the light projector 200*b*, passed through the cornea 5 and the pupil 4, and entered a leftmost position of the optical element 400*a*-2 is largely refracted rightward by the optical element 400*a*-2, and enters the front end 20H-2*a* of the right pupil-side region 20H-2 as the display light DL4.

In FIG. 34, for example, the projection light beam PL3 projected from the light projector 200*b*, passed through the cornea 5 and the pupil 4, and entered a second position between the leftmost position and the middle position of the optical element 400*a*-2 is refracted rightward by the optical element 400*a*-2, and enters the back end 20H-2*b* of the right pupil-side region 20H-2 as the display light DL3.

In FIG. 34, for example, any projection light beam projected from the light projector 200*b*, passed through the cornea 5 and the pupil 4, and entered a position between the leftmost position and the second position of the optical element 400*a*-2 is refracted rightward by the optical element 400*a*-2, and enters the right pupil-side region 20H-2 as the display light.

In FIG. 34, for example, any projection light beam projected from the light projector 200*b*, passed through the cornea 5 and the pupil 4, and entered a position between the second position and the middle position of the optical element 400*a*-2 is refracted rightward by the optical element 400*a*-2, and enters the ambient light irradiation region 10 as the display light.

As is apparent from FIG. 34, the plurality of projection light beams projected from the light projector 200*b* are outputted from the optical element 400*a*-2 in such a manner as to intersect with each other inside or in the vicinity of the optical element 400*a*-2.

Display Device According to Working Example 3 of Fourth Embodiment

As illustrated in FIG. 35, the optical element 400*a*-3 of the display device 350-3 according to the working example 3 of the fourth embodiment is embedded in an end portion of the lens 6 on the pupil 4 side in a curved state in such a manner as to be adjacent to the pupil 4.

In such a curved state, the optical element 400*a*-3 has a refractive index profile in which a refractive index decreases in such a manner that the entering light is refracted outward (in the direction from the central portion to the peripheral portion) as the light travels from the central portion to the peripheral portion. Further, as another example, in a case of using an optical element that diffracts the entering light beam, it is set in such a manner that a light beam that enters the peripheral portion of the optical element has a larger angle of outward diffraction as compared with a light beam that enters the center portion of the optical element.

In FIG. 35, for example, the projection light beam PL0 projected from the light projector 200*b*, passed through the cornea 5 and the pupil 4, and entered a middle position of the optical element 400*a*-3 travels straight inside the optical element 400*a*-3, and enters the ambient light irradiation region 10.

In FIG. 35, for example, the projection light beam PL1 projected from the light projector 200*b*, passed through the cornea 5 and the pupil 4, and entered a rightmost position of the optical element 400*a*-3 is largely refracted rightward by the optical element 400*a*-3, and enters the front end 20H-2*a* of the right pupil-side region 20H-2 as the display light DL1.

In FIG. 35, for example, the projection light beam PL2 projected from the light projector 200*b*, passed through the cornea 5 and the pupil 4, and entered a first position between the rightmost position and the middle position of the optical element 400*a*-3 is refracted rightward by the optical element 400*a*-3, and enters the back end 20H-2*b* of the right pupil-side region 20H-2 as the display light DL2.

In FIG. 35, for example, any projection light beam projected from the light projector 200*b*, passed through the cornea 5 and the pupil 4, and entered a position between the rightmost position and the first position of the optical element 400a-3 is refracted rightward by the optical element 400a-3, and enters the right pupil-side region 20H-2 as the display light.

In FIG. 35, for example, any projection light beam projected from the light projector 200b, passed through the cornea 5 and the pupil 4, and entered a position between the first position and the middle position of the optical element 400a-3 is refracted rightward by the optical element 400a-3, and enters the ambient light irradiation region 10 as the display light.

In FIG. 35, for example, the projection light beam PL4 projected from the light projector 200b, passed through the cornea 5 and the pupil 4, and entered a leftmost position of the optical element 400a-3 is largely refracted leftward by the optical element 400a-3, and enters the front end 20H-1a of the left pupil-side region 20H-1 as the display light DL4.

In FIG. 35, for example, the projection light beam PL3 projected from the light projector 200b, passed through the cornea 5 and the pupil 4, and entered a second position between the leftmost position and the middle position of the optical element 400a-3 is refracted leftward by the optical element 400a-3, and enters the back end 20H-1b of the left pupil-side region 20H-1 as the display light DL3.

In FIG. 35, for example, any projection light beam projected from the light projector 200b, passed through the cornea 5 and the pupil 4, and entered a position between the leftmost position and the second position of the optical element 400a-3 is refracted leftward by the optical element 400a-3, and enters the left pupil-side region 20H-1 as the display light.

In FIG. 35, for example, any projection light beam projected from the light projector 200b, passed through the cornea 5 and the pupil 4, and entered a position between the second position and the middle position of the optical element 400a-3 is refracted leftward by the optical element 400a-3, and enters the ambient light irradiation region 10 as the display light.

Display Device According to Working Example 4 of Fourth Embodiment

As illustrated in FIG. 36, the optical element 400a-4 of the display device 350-4 according to the working example 4 of the fourth embodiment is embedded in an end portion of the lens 6 on the opposite side to the pupil 4 side in a curved state in such a manner as to be opposed to the pupil 4.

In such a curved state, the optical element 400a-4 has a refractive index profile in which a refractive index decreases in such a manner that the entering light is refracted outward (in the direction from the central portion to the peripheral portion) as the light travels from the central portion to the peripheral portion. Further, as another example, in a case of using an optical element that diffracts the entering light beam, it is set in such a manner that a light beam that enters the peripheral portion of the optical element has a larger angle of outward diffraction as compared with a light beam that enters the center portion of the optical element.

In FIG. 36, for example, the projection light beam PL0 projected from the light projector 200b, passed through the cornea 5 and the pupil 4, and entered a middle position of the optical element 400a-4 travels straight inside the optical element 400a-4, and enters the ambient light irradiation region 10.

In FIG. 36, for example, the projection light beam PL1 projected from the light projector 200b, passed through the cornea 5 and the pupil 4, and entered a rightmost position of the optical element 400a-4 is largely refracted rightward by the optical element 400a-4, and enters the front end 20H-2a of the right pupil-side region 20H-2 as the display light DL1.

In FIG. 36, for example, the projection light beam PL2 projected from the light projector 200b, passed through the cornea 5 and the pupil 4, and entered a first position between the rightmost position and the middle position of the optical element 400a-4 is refracted rightward by the optical element 400a-4, and enters the back end 20H-2b of the right pupil-side region 20H-2 as the display light DL2.

In FIG. 36, for example, any projection light beam projected from the light projector 200b, passed through the cornea 5 and the pupil 4, and entered a position between the rightmost position and the first position of the optical element 400a-4 is refracted rightward by the optical element 400a-4, and enters the right pupil-side region 20H-2 as the display light.

In FIG. 36, for example, any projection light beam projected from the light projector 200b, passed through the cornea 5 and the pupil 4, and entered a position between the first position and the middle position of the optical element 400a-4 is refracted rightward by the optical element 400a-4, and enters the ambient light irradiation region 10 as the display light.

In FIG. 36, for example, the projection light beam PL4 projected from the light projector 200b, passed through the cornea 5 and the pupil 4, and entered a leftmost position of the optical element 400a-4 is largely refracted leftward by the optical element 400a-3, and enters the front end 20H-1a of the left pupil-side region 20H-1 as the display light DL4.

In FIG. 36, for example, the projection light beam PL3 projected from the light projector 200b, passed through the cornea 5 and the pupil 4, and entered a second position between the leftmost position and the middle position of the optical element 400a-4 is refracted leftward by the optical element 400a-4, and enters the back end 20H-1b of the left pupil-side region 20H-1 as the display light DL3.

In FIG. 36, for example, any projection light beam projected from the light projector 200b, passed through the cornea 5 and the pupil 4, and entered a position between the leftmost position and the second position of the optical element 400a-4 is refracted leftward by the optical element 400a-4, and enters the left pupil-side region 20H-1 as the display light.

In FIG. 36, for example, any projection light beam projected from the light projector 200b, passed through the cornea 5 and the pupil 4, and entered a position between the second position and the middle position of the optical element 400a-4 is refracted leftward by the optical element 400a-4, and enters the ambient light irradiation region 10 as the display light.

Display Device According to Working Example 5 of Fourth Embodiment

As illustrated in FIG. 37, the light irradiation system 400-5 of the display device 350-5 according to the working example 5 of the fourth embodiment includes the plurality of (e.g., two) optical elements 400a-5-1 and 400a-5-2.

The optical elements 400a-5-1 and 400a-5-2 according to the working example 5 are embedded inside the lens 6 in such a manner as to be opposed to each other.

In detail, the optical element 400a-5-1 is embedded in an end portion of the lens 6 on the pupil 4 side in a curved state in such a manner as to be adjacent to the pupil 4. The optical element 400a-5-2 is embedded in an end portion of the lens 6 on the opposite side to the pupil 4 side in a curved state in such a manner as to be opposed to the pupil 4.

In such a curved state, the optical element 400*a*-5-1 has a refractive index profile in which a refractive index increases in such a manner that the entering light is refracted inward (in the direction from the peripheral portion to the central portion) as the light travels from the central portion to the peripheral portion. Further, as another example, in a case of using, instead of the optical element 400*a*-5-1, an optical element that diffracts the entering light beam, it is set in such a manner that a light beam that enters the peripheral portion of the optical element has a larger angle of inward diffraction as compared with a light beam that enters the center portion of the optical element.

In such a curved state, the optical element 400*a*-5-2 has a refractive index profile in which a refractive index decreases in such a manner that the entering light is refracted outward (in the direction from the central portion to the peripheral portion) as the light travels from the central portion to the peripheral portion. Further, as another example, in a case of using, instead of the optical element 400*a*-5-2, an optical element that diffracts the entering light beam, it is set in such a manner that a light beam that enters the peripheral portion of the optical element has a larger angle of outward diffraction as compared with a light beam that enters the center portion of the optical element.

In FIG. 37, for example, the projection light beam PL0 projected from the light projector 200*b*, passed through the cornea 5 and the pupil 4, and entered a middle position of the optical element 400*a*-5-1 travels straight to sequentially pass through the optical element 400*a*-5-1 and the optical element 400*a*-5-2, and enters the ambient light irradiation region 10.

In FIG. 37, for example, the projection light beam PL1 projected from the light projector 200*b*, passed through the cornea 5 and the pupil 4, and entered a rightmost position of the optical element 400*a*-5-1 is largely refracted leftward by the optical element 400*a*-5-1, and enters a leftmost position of the optical element 400*a*-5-2. The projection light beam PL1 entered the leftmost position is largely refracted leftward by the optical element 400*a*-5-2, enters the front end 20H-1*a* of the left pupil-side region 20H-1 as the display light DL1.

In FIG. 37, for example, the projection light beam PL2 projected from the light projector 200*b*, passed through the cornea 5 and the pupil 4, and entered a first position between the rightmost position and the middle position of the optical element 400*a*-5-1 is refracted leftward by the optical element 400*a*-1, and enters a second position between the leftmost position and a middle position of the optical element 400*a*-5-2. The projection light beam PL2 entered the second position is refracted leftward by the optical element 400*a*-5-2, and enters the back end 20H-1*b* of the left pupil-side region 20H-1 as the display light DL2.

In FIG. 37, for example, any projection light beam projected from the light projector 200*b*, passed through the cornea 5 and the pupil 4, and entered a position between the rightmost position and the first position of the optical element 400*a*-5-1 enters a position between the leftmost position and the second position of the optical element 400*a*-5-2. The entered projection light beam is refracted leftward by the optical element 400*a*-5-2, and enters the left pupil-side region 20H-1 as the display light.

In FIG. 37, for example, any projection light beam projected from the light projector 200*b*, passed through the cornea 5 and the pupil 4, and entered a position between the first position and the middle position of the optical element 400*a*-5-1 is refracted leftward by the optical element 400*a*-5-1, and enters a position between the second position and the middle position of the optical element 400*a*-5-1. The entered projection light beam is refracted leftward by the optical element 400*a*-5-2, and enters the ambient light irradiation region 10 as the display light.

In FIG. 37, for example, the projection light beam PL4 projected from the light projector 200*b*, passed through the cornea 5 and the pupil 4, and entered a leftmost position of the optical element 400*a*-5-1 is largely refracted rightward by the optical element 400*a*-5-1, and enters a rightmost position of the optical element 400*a*-5-2. The projection light beam PL4 entered the rightmost position is largely refracted rightward by the optical element 400*a*-5-2, and enters the front end 20H-2*a* of the right pupil-side region 20H-2 as the display light DL4.

In FIG. 37, for example, the projection light beam PL3 projected from the light projector 200*b*, passed through the cornea 5 and the pupil 4, and entered a second position between the leftmost position and the middle position of the optical element 400*a*-2 is refracted rightward by the optical element 400*a*-5-1, and enters a fourth position between the rightmost position and the middle position of the optical element 400*a*-5-2. The projection light beam PL3 entered the fourth position is refracted rightward by the optical element 400*a*-5-2, and enters the back end 20H-2*b* of the right pupil-side region 20H-2 as the display light DL3.

In FIG. 37, for example, any projection light beam projected from the light projector 200*b*, passed through the cornea 5 and the pupil 4, and entered a position between the leftmost position and the third position of the optical element optical element 400*a*-5-1 enters a position between the rightmost position and the fourth position of the optical element 400*a*-5-2. The entered projection light beam is refracted rightward by the optical element 400*a*-5-2, and enters the right pupil-side region 20H-2 as the display light.

In FIG. 37, for example, any projection light beam projected from the light projector 200*b*, passed through the cornea 5 and the pupil 4, and entered a position between the third position and the middle position of the optical element 400*a*-5-2 is refracted rightward by the optical element 400*a*-5-2, and enters a position between the fourth position and the middle position of the optical element 400*a*-5-2. The entered projection light beam is refracted rightward by the optical element 400*a*-5-2, and enters the ambient light irradiation region 10 as the display light.

Display Device According to Working Example 6 of Fourth Embodiment

As illustrated in FIG. 38, the optical element 400*a*-6 of the display device 350-6 according to the working example 6 of the fourth embodiment is embedded in an end portion of the lens 6 on the pupil 4 side in a curved state in such a manner as to be adjacent to the pupil 4.

In such a curved state, the optical element 400*a*-6 has a refractive index profile in which a refractive index increases in such a manner that the entering light is refracted inward (in the direction from the peripheral portion to the central portion) as the light travels from the central portion to the peripheral portion. Further, as another example, in a case of using an optical element that diffracts the entering light beam, it is set in such a manner that a light beam that enters the peripheral portion of the optical element has a larger angle of inward diffraction as compared with a light beam that enters the center portion of the optical element.

In FIG. 38, for example, the projection light beam PL0 projected from the light projector 200b, passed through the cornea 5 and the pupil 4, and entered a middle position of the optical element 400a-6 travels straight inside the optical element 400a-6, and enters the ambient light irradiation region 10.

In FIG. 38, for example, the projection light beam PL1 projected from the light projector 200b, passed through the cornea 5 and the pupil 4, and entered a rightmost position of the optical element 400a-6 is largely refracted leftward by the optical element 400a-6, and enters the front end 20H-1a of the left pupil-side region 20H-1 as the display light DL1.

In FIG. 38, for example, the projection light beam PL2 projected from the light projector 200b, passed through the cornea 5 and the pupil 4, and entered a first position between the rightmost position and the middle position of the optical element 400a-6 is refracted leftward by the optical element 400a-6, and enters the back end 20H-1b of the left pupil-side region 20H-1 as the display light DL2.

In FIG. 38, for example, any projection light beam projected from the light projector 200b, passed through the cornea 5 and the pupil 4, and entered a position between the rightmost position and the first position of the optical element 400a-6 is refracted leftward by the optical element 400a-6, and enters the left pupil-side region 20H-1 as the display light.

In FIG. 38, for example, any projection light beam projected from the light projector 200b, passed through the cornea 5 and the pupil 4, and entered a position between the first position and the middle position of the optical element 400a-6 is refracted leftward by the optical element 400a-6, and enters the ambient light irradiation region 10 as the display light.

In FIG. 38, for example, the projection light beam PL4 projected from the light projector 200b, passed through the cornea 5 and the pupil 4, and entered a leftmost position of the optical element 400a-6 is largely refracted rightward by the optical element 400a-6, and enters the front end 20H-2a of the right pupil-side region 20H-2 as the display light DL4.

In FIG. 38, for example, the projection light beam PL3 projected from the light projector 200b, passed through the cornea 5 and the pupil 4, and entered a second position between the leftmost position and the middle position of the optical element 400a-6 is refracted rightward by the optical element 400a-6, and enters the back end 20H-2b of the right pupil-side region 20H-2 as the display light DL3.

In FIG. 38, for example, any projection light beam projected from the light projector 200b, passed through the cornea 5 and the pupil 4, and entered a position between the leftmost position and the second position of the optical element 400a-6 is refracted rightward by the optical element 400a-6, and enters the right pupil-side region 20H-2 as the display light.

In FIG. 38, for example, any projection light beam projected from the light projector 200b, passed through the cornea 5 and the pupil 4, and entered a position between the second position and the middle position of the optical element 400a-6 is refracted rightward by the optical element 400a-6, and enters the ambient light irradiation region 10 as the display light.

As is apparent from FIG. 38, the plurality of projection light beams projected from the light projector 200b are outputted from the optical element 400a-6 in such a manner as to intersect with each other inside or in the vicinity of the optical element 400a-6 (e.g., inside the lens 6).

The display device 350 according to the fourth embodiment described above also exhibits substantially similar effects as the display device 50 according to the first embodiment and the display device 150 according to the second embodiment.

8. <Display Device According to Fifth Embodiment of the Present Technology>

A display device according to a fifth embodiment of the present technology has a configuration similar to that of any of the display devices according to the first to fourth embodiments, except that characteristics of a display element or an optical element are different.

A display element or an optical element of the display device according to the fifth embodiment (including a light projector in a case of the optical element) develops a viewing angle characteristic which, in the expanded visual field region, leads to a lower visibility in a peripheral portion than in a center portion. The expanded visual field region corresponds to a region including the ambient light irradiation region 10 and a region outside the ambient light irradiation region 10 (e.g., the pupil-side region 20).

FIG. 39 is a diagram illustrating an example of an expanded visual field region of a user when the display element or the optical element according to the fifth embodiment is mounted on the eyeball.

Referring to FIG. 39, when the user looks at an external environment through the display element or the optical element, the center portion of the expanded visual field region is in a clear area 220 with relatively high visibility, and the peripheral portion of the expanded visual field region is in an unclear area 210 with relatively low visibility.

Specifically, the display element or the optical element of the display device according to the fifth embodiment may, in the expanded visual field region described above, for example: function as an element having high visibility in the center portion of the normal visual field region corresponding to the ambient light irradiation region 10; and function as the element whose visibility gradually decreases as a position approaches the maximum expanded visual field region in the region outside the center portion of the normal visual field region.

The display element or the optical element of the display device according to the fifth embodiment may, in the expanded visual field region described above, for example: function as an element having high visibility in the normal visual field region corresponding to the ambient light irradiation region 10; and function as the element whose visibility gradually decreases as a position approaches the maximum expanded visual field region in the region outside the normal visual field region.

The display element or the optical element of the display device according to the fifth embodiment may, in the expanded visual field region described above, for example: function as an element having high visibility in the normal visual field region corresponding to the ambient light irradiation region 10, and a predetermined region outside the normal visual field region and inside the maximum expanded visual field region; and function as the element whose visibility gradually decreases as a position approaches the maximum expanded visual field region in the region outside the predetermined region.

Examples of the display element or the optical element that develops the viewing angle characteristics as described above include an element which reduces the visibility of the peripheral portion more than the central portion by displaying the peripheral portion in the expanded visual field region in such a manner that the peripheral portion is bright or dark as compared with the central portion.

The display element or the optical element that develops the viewing angle characteristics as described above may be, for example, an element that makes the peripheral portion less conspicuous as compared with the central portion by displaying a single color on the peripheral portion in the expanded visual field region in an overlay manner or by displaying a pattern such as a texture in an overlay manner.

The display element or the optical element that develops the viewing angle characteristics as described above may be, for example, an element that makes the peripheral portion less conspicuous as compared with the central portion in the normal visual field region, by lowering an intensity of the ambient light to enter the peripheral portion in the normal visual field region.

Further, examples of the display element or the optical element of the display device according to the fifth embodiment include an element having a characteristic that aberrations or haze differ depending on an angle of incidence of light. Such an optical element includes, for example, an optical element having a viewing-angle-dependent transmission characteristic (e.g., a hologram element). Such a display element includes, for example, a display element including a liquid crystal display having a viewing angle characteristic and a light source.

According to the display device of the fifth embodiment, for example, it is possible to suppress unnecessary information in the peripheral portion of the visual field from being recognized by the user, and cause the user's feeling to be concentrated on necessary information in the central portion of the visual field.

It is to be noted that the present technology may have the following configurations.

(1)
A display device including
a light irradiation system configured to apply light through a pupil on at least a region outside an ambient light irradiation region, within a larger region than the ambient light irradiation region, the larger region including the ambient light irradiation region, the ambient light irradiation region being a region in a retina on which ambient light is to be applied through the pupil.

(2)
The display device according to (1), in which the ambient light irradiation region is determined by a part of a face around the retina that prevents the ambient light from reaching the retina, and/or an object mounted on the face or a head.

(3)
The display device according to (1) or (2), in which the light irradiation system is configured to apply light on either a region on a side of the pupil as seen from the ambient light irradiation region in the retina, or a region across the ambient light irradiation region and the region on the side of the pupil.

(4)
The display device according to any one of (1) to (3), in which the light irradiation system is configured to apply light selectively on any one of the ambient light irradiation region, a region on a side of the pupil of the ambient light irradiation region in the retina, and a region across the ambient light irradiation region and the region on the side of the pupil.

(5)
The display device according to any one of (1) to (4), in which the light irradiation system outputs light beams in a manner that the light beams intersect with each other in a vicinity of the pupil.

(6)
The display device according to any one of (1) to (5), in which the light irradiation system applies light on a region, of the retina of one eye, on a side opposite to a side of the other eye.

(7)
The display device according to any one of (1) to (6), in which the light irradiation system includes a display element that is to be integrated with an eyeball at least while in use.

(8)
The display device according to any one of (1) to (7), in which the display element develops a viewing angle characteristic which, in a visual field region corresponding to a region larger than the ambient light irradiation region, leads to a lower visibility in a peripheral portion than in a center portion.

(9)
The display device according to (7) or (8), in which the display element includes a contact lens type display element.

(10)
The display device according to any one of (7) to (9), in which the display element includes an intraocular lens type display element.

(11)
The display device according to any one of (7) to (10), in which the display element includes a plurality of pixels arranged two-dimensionally or three-dimensionally.

(12)
The display device according to (11), in which the display element has a transmitting section that transmits at least a portion of light having a specific wavelength, and a light-shielding section that shields the light.

(13)
The display device according to (12), in which the transmitting section includes a gap between the pixels.

(14)
The display device according to (12), in which the light-shielding section includes a gap between the pixels.

(15)
The display device according to (12), in which the transmitting section includes a wiring line disposed between the pixels.

(16)
The display device according to (12), in which the light-shielding section includes a wiring line disposed between the pixels.

(17)
The display device according to (12), in which the transmitting section includes a wiring line provided between pixel groups each including at least two pixels.

(18)
The display device according to (12), in which the light-shielding section includes a wiring line provided between pixel groups each including at least two pixels.

(19)
The display device according to (12), in which the display element includes the plurality of pixels disposed in a staggered arrangement.

(20)
The display device according to any one of (7) to (19), in which the display element includes a self-luminous display element.

(21)
The display device according to any one of (7) to (19), in which the display element includes a liquid crystal display and a light source.

(22)
The display device according to any one of (1) to (21), further including
a sensor that detects outside-of-normal-visual-field-region information which is information outside a normal visual field region corresponding to the ambient light irradiation region, in which
the display device displays the outside-of-normal-visual-field-region information detected by the sensor on an expanded visual field region corresponding to the larger region.

(23)
The display device according to any one of (1) to (6), in which the light irradiation system includes an optical element that is to be integrated with an eyeball at least while in use, and a light projector that projects light toward the optical element.

(24)
The display device according to (23), in which the optical element develops a viewing angle characteristic which, in a visual field region corresponding to a region larger than the ambient light irradiation region, leads to a lower visibility in a peripheral portion than in a center portion.

(25)
The display device according to (23) or (24), in which the optical element includes a contact lens type optical element.

(26)
The display device according to (23) or (24), in which the optical element includes an intraocular lens type optical element.

(27)
A display system including:
the display device according to any one of (1) to (26); and
a control device that controls the display device.

REFERENCE SIGNS LIST

1: retina
4: pupil
10: ambient light irradiation region
20: pupil-side region (region on pupil side)
50, 150, 250, 350: display device
100, 200, 300, 400: light irradiation system
100a, 300a: display element
200a, 400a: optical element
200b: light projector

The invention claimed is:

1. A display device, comprising;
a light irradiation system configured to apply light on at least a region outside an ambient light irradiation region of a retina, wherein
the application of the light is within a larger region, of the retina, larger than the ambient light irradiation region,
the larger region includes the ambient light irradiation region,
the ambient light irradiation region corresponds to a region in the retina that receives ambient light through a pupil, and
the ambient light does not reach the region outside the ambient light irradiation region of the retina; and
a sensor configured to detect outside-of-normal-visual-field-region information which is information outside a normal visual field region corresponding to the ambient light irradiation region, wherein
the display device is configured to display the outside-of-normal-visual-field-region information on an expanded visual field region corresponding to the larger region.

2. The display device according to claim 1, wherein the ambient light irradiation region is determined by at least one a part of a face around the retina that prevents the ambient light from reaching the retina, or an object on the face or a head.

3. The display device according to claim 1, wherein the light irradiation system is further configured to apply the light on one of a region on a side of the pupil as seen from the ambient light irradiation region in the retina, or a region across the ambient light irradiation region and the region on the side of the pupil.

4. The display device according to claim 1, wherein the light irradiation system is further configured to apply the light selectively on one of:
the ambient light irradiation region,
a region on a side of the pupil of the ambient light irradiation region in the retina, or
a region across the ambient light irradiation region and the region on the side of the pupil.

5. The display device according to claim 1, wherein the light irradiation system is further configured to output light beams intersect in a vicinity of the pupil.

6. The display device according to claim 1, wherein the light irradiation system is further configured to apply the light on a specific region, of the retina of a first eye, on a side opposite to a side of a second eye.

7. The display device according to claim 1, wherein the light irradiation system includes a display element that is integrable with an eyeball.

8. The display device according to claim 7, wherein the display element has a viewing angle characteristic which, in a visual field region corresponding to the larger region, causes a lower visibility in a peripheral portion of the larger region than in a center portion of the larger region.

9. The display device according to claim 7, wherein the display element includes a contact lens type display element.

10. The display device according to claim 7, wherein the display element includes an intraocular lens type display element.

11. The display device according to claim 7, wherein the display element includes a plurality of pixels in one of a two-dimensional arrangement or a three-dimensional arrangement.

12. The display device according to claim 11, wherein the display element further includes:
a transmitting section configured to transmit at least a first portion of the light having a specific wavelength; and
a light-shielding section configured to shield the light.

13. The display device according to claim 12, wherein the transmitting section includes a gap between the plurality of pixels.

14. The display device according to claim 12, wherein the light-shielding section includes a gap between the plurality of pixels.

15. The display device according to claim 12, wherein the transmitting section includes a wiring line between the plurality of pixels.

16. The display device according to claim 12, wherein the light-shielding section includes a wiring line between the plurality of pixels.

17. The display device according to claim 12, wherein
the transmitting section includes a wiring line between a plurality of pixel groups, and
each pixel group of the plurality of pixel groups includes at least two pixels of the plurality of pixels.

18. The display device according to claim 12, wherein
the light-shielding section includes a wiring line between a plurality of pixel groups, and
each pixel group of the plurality of pixel groups includes at least two pixels of the plurality of pixels.

19. The display device according to claim 12, wherein the display element includes the plurality of pixels in a staggered arrangement.

20. The display device according to claim 7, wherein the display element includes a self-luminous display element.

21. The display device according to claim 7, wherein the display element includes a liquid crystal display and a light source.

22. The display device according to claim 1, wherein the light irradiation system includes:
an optical element that is integrable with an eyeball; and
a light projector configured to project the light toward the optical element.

23. The display device according to claim 22, wherein the optical element has a viewing angle characteristic which, in a visual field region corresponding to the larger region, causes a lower visibility in a peripheral portion of the larger region than in a center portion of the larger region.

24. The display device according to claim 22, wherein the optical element includes a contact lens type optical element.

25. The display device according to claim 22, wherein the optical element includes an intraocular lens type optical element.

26. A display system, comprising:
the display device according to claim 1; and
a control device configured to control the display device.

* * * * *